United States Patent [19]

Merz

[11] Patent Number: 4,479,572

[45] Date of Patent: Oct. 30, 1984

[54] CONVEYOR SYSTEM

[76] Inventor: William J. Merz, 220 W. Rittenhouse Sq., Philadelphia, Pa. 19103

[21] Appl. No.: 319,975

[22] Filed: Nov. 10, 1981

[51] Int. Cl.³ .............................................. B65G 21/20
[52] U.S. Cl. .................................... 198/345; 198/472; 198/624; 198/787; 198/790
[58] Field of Search ............... 198/345, 472, 624, 787, 198/780, 457, 723, 453, 790; 186/38, 46; 414/403

[56] References Cited

U.S. PATENT DOCUMENTS

| | | | |
|---|---|---|---|
| 746,145 | 12/1903 | Perky | 198/624 |
| 2,155,173 | 4/1939 | Sparling et al. | 414/403 |
| 2,548,131 | 4/1951 | Stern | 198/472 |
| 2,622,721 | 12/1952 | Ferguson | 198/787 |
| 2,836,284 | 5/1958 | Gilliatt | 198/787 |
| 3,275,124 | 9/1966 | Lutes et al. | 198/787 |
| 3,690,433 | 9/1972 | Buldini | 198/345 |
| 3,826,351 | 7/1974 | Fromme | 198/787 |
| 3,866,744 | 2/1975 | Klose | 193/44 |

FOREIGN PATENT DOCUMENTS

| | | | |
|---|---|---|---|
| 145734 | 1/1981 | Fed. Rep. of Germany | 198/624 |
| 8000801 | 9/1981 | Netherlands | 198/790 |
| 10858 | of 1900 | United Kingdom | 198/780 |

Primary Examiner—Joseph E. Valenza
Assistant Examiner—Daniel R. Alexander
Attorney, Agent, or Firm—Synnestvedt & Lechner

[57] ABSTRACT

A conveyor system for trays, pallets and the like wherein the trays or other articles to be conveyed are supported at each side thereof by spaced parallel sets of rollers, one set comprising a set of drive rollers while the other set comprises idler rollers. The invention includes an arrangement for driving the drive rollers by an endless belt to provide a uniform drive speed of each of the drive rollers. The roller and drive arrangement permits the conveyor to be built in turning as well as ascending and descending configurations. The conveyor can be manufactured and installed in modular sections, each of which may have its own drive or may be driven from an adjacent section. An arrangement is disclosed for producing relatively sharp conveyor turns of any desired angle.

25 Claims, 29 Drawing Figures

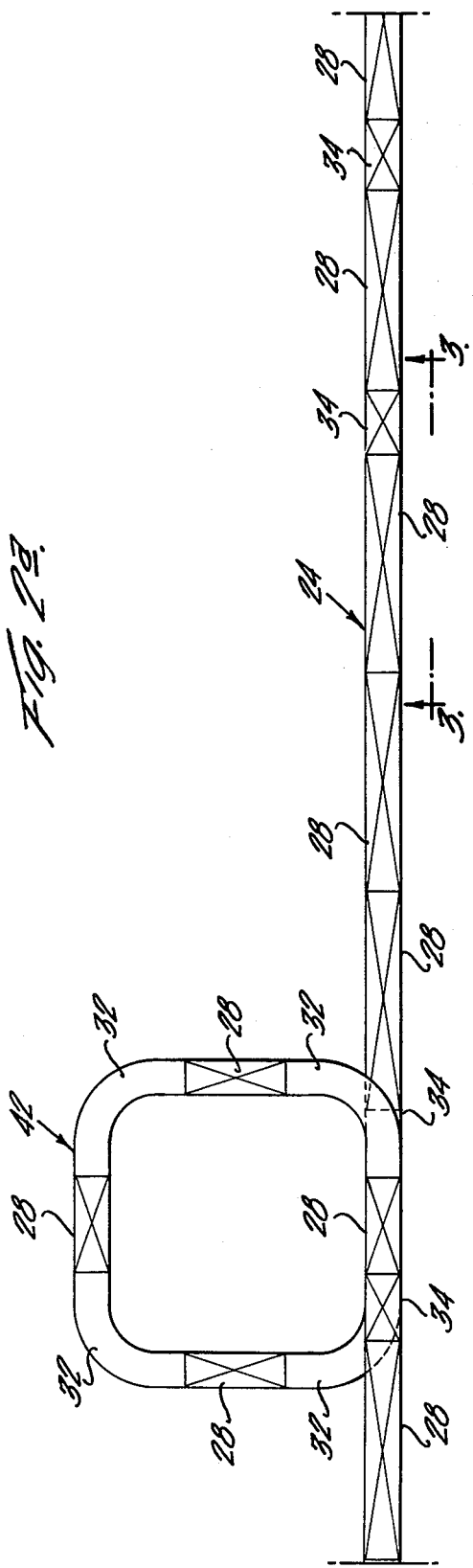
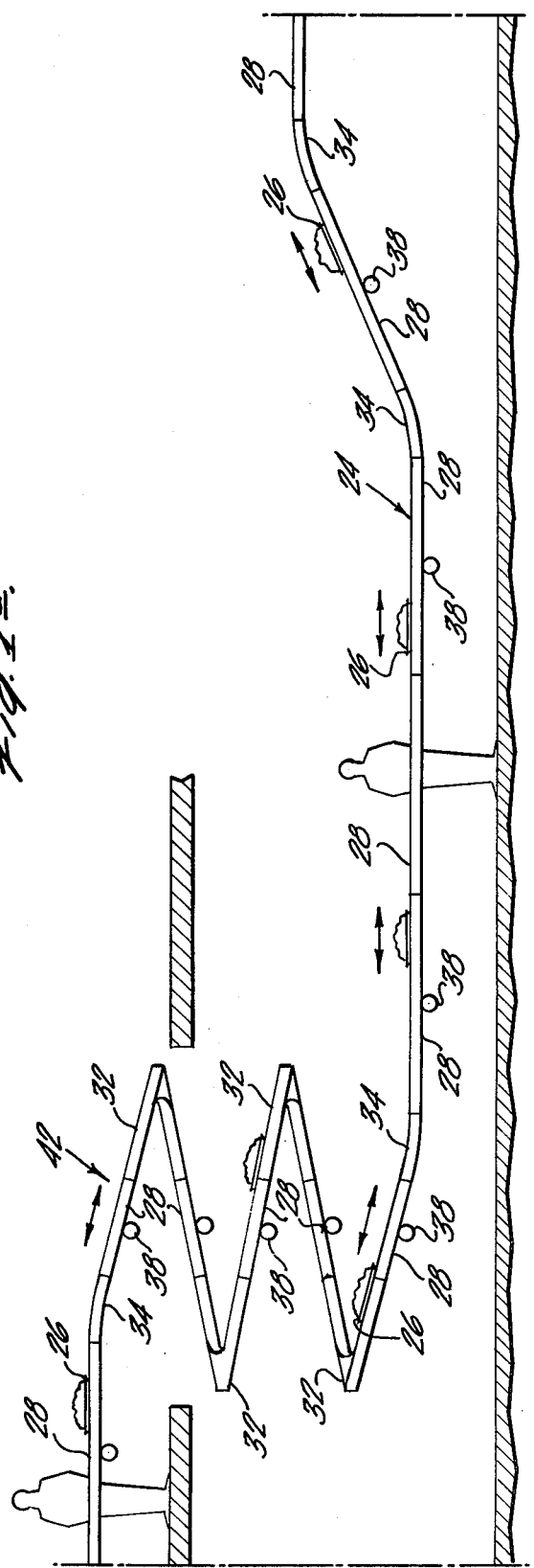

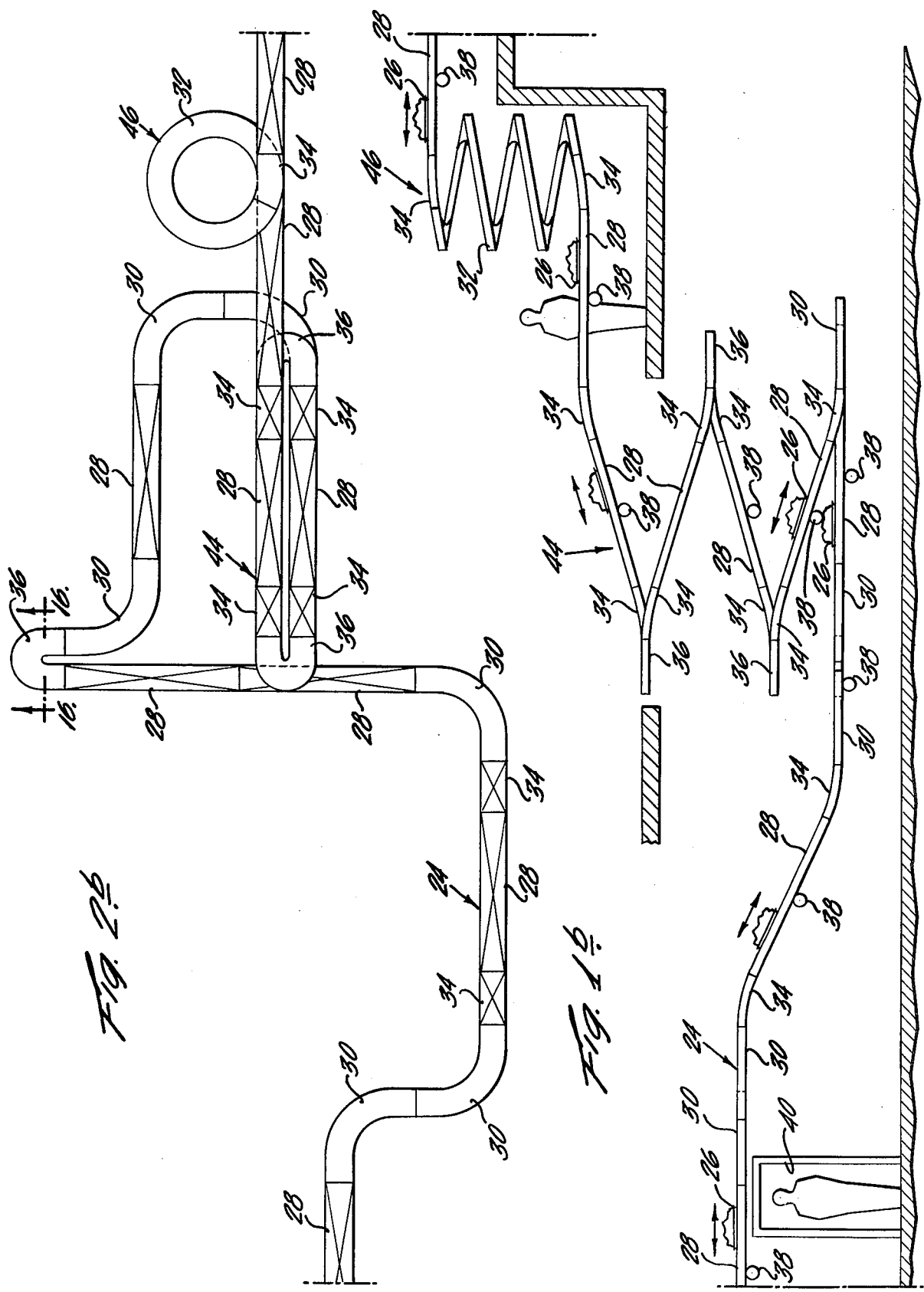

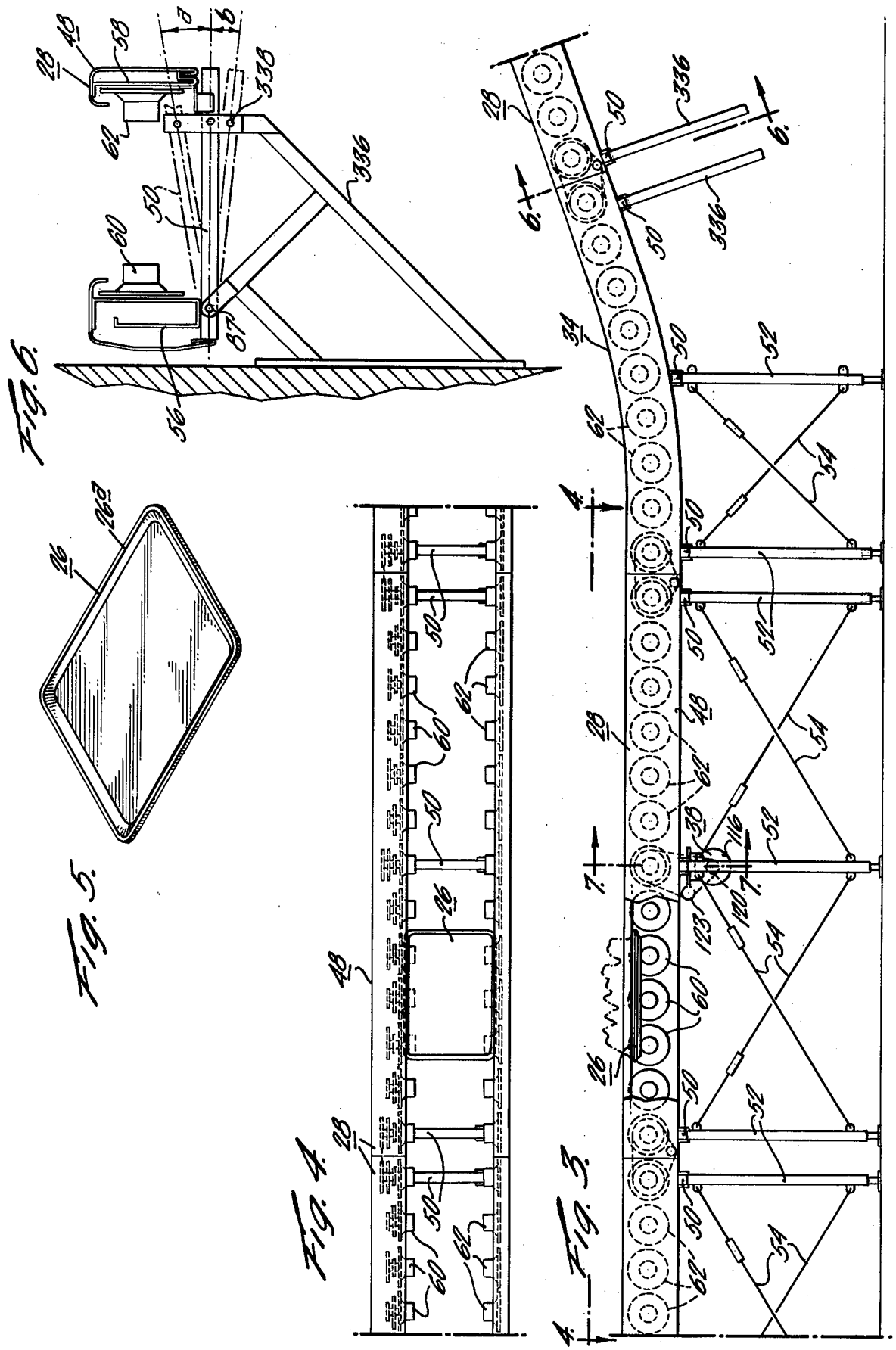

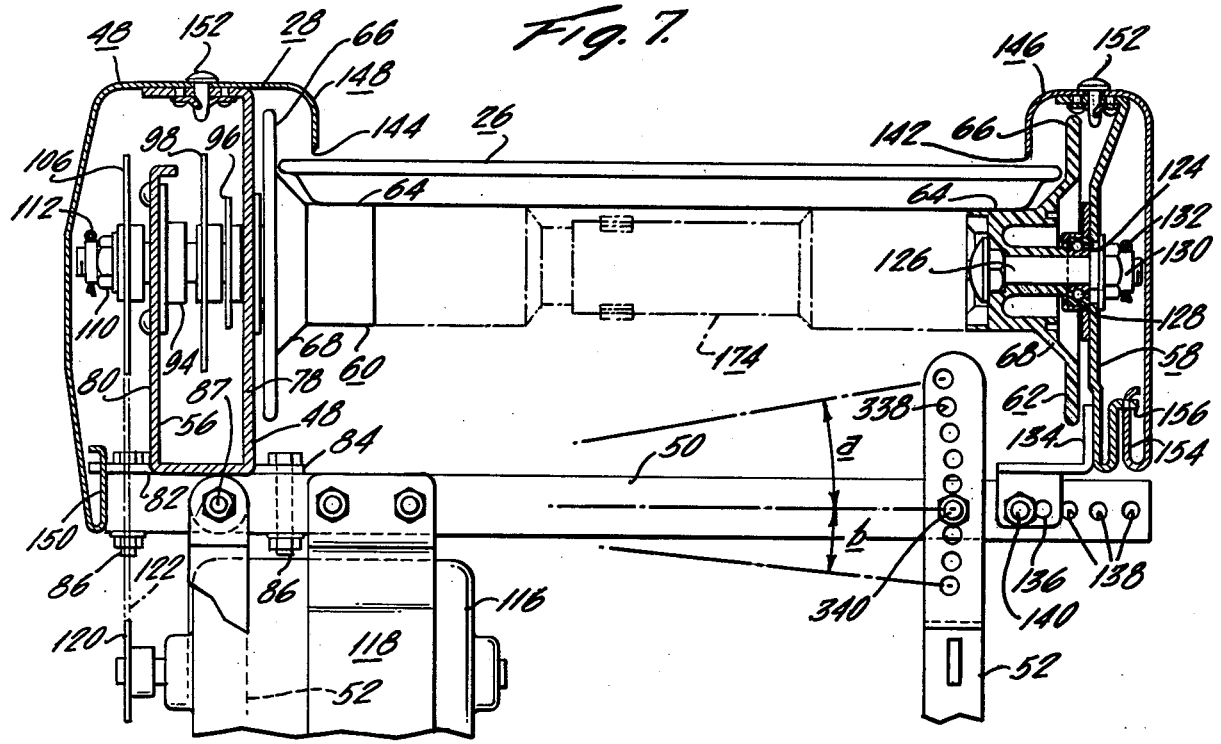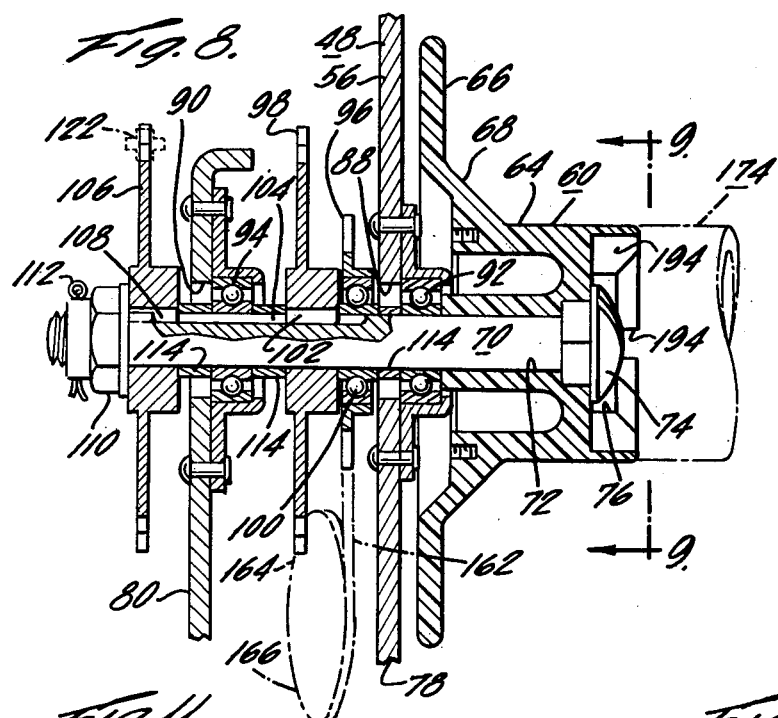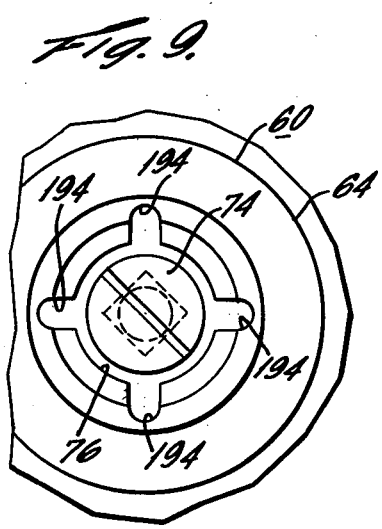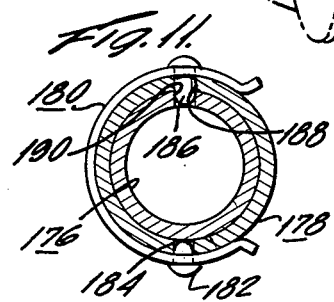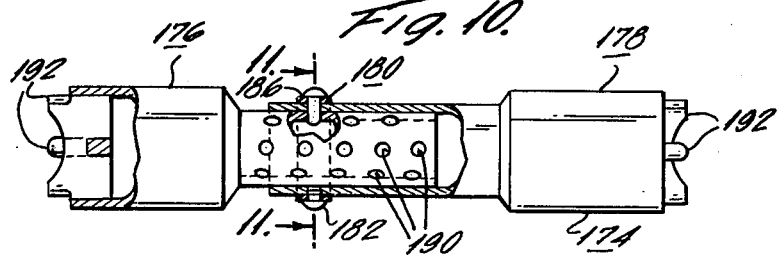

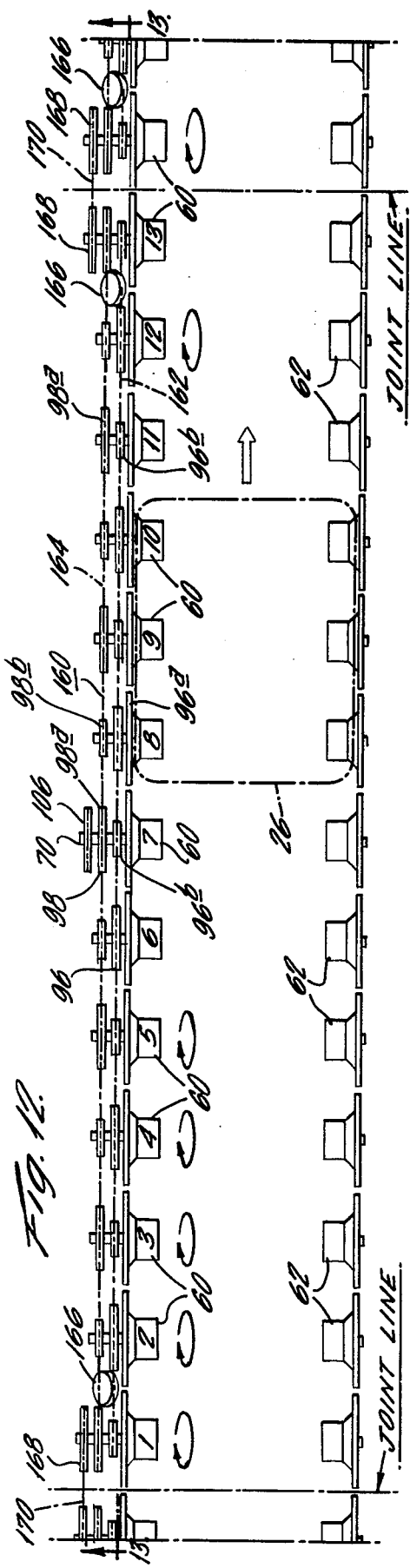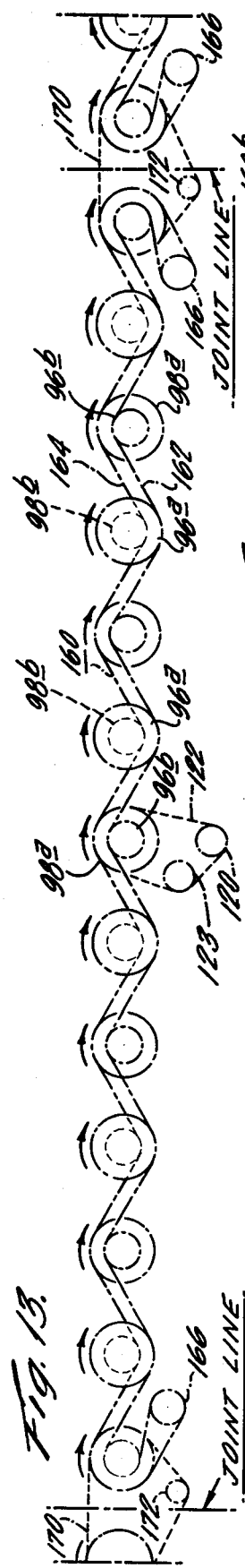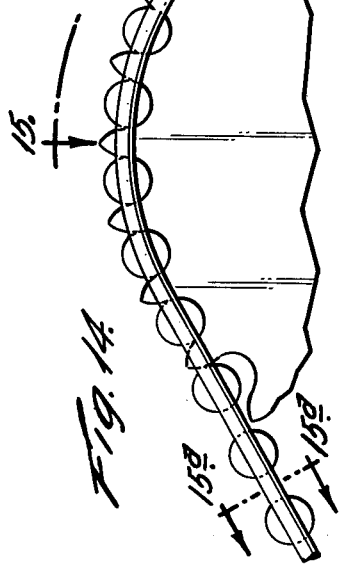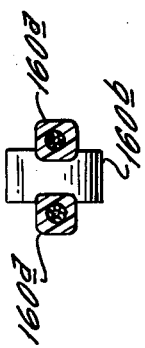

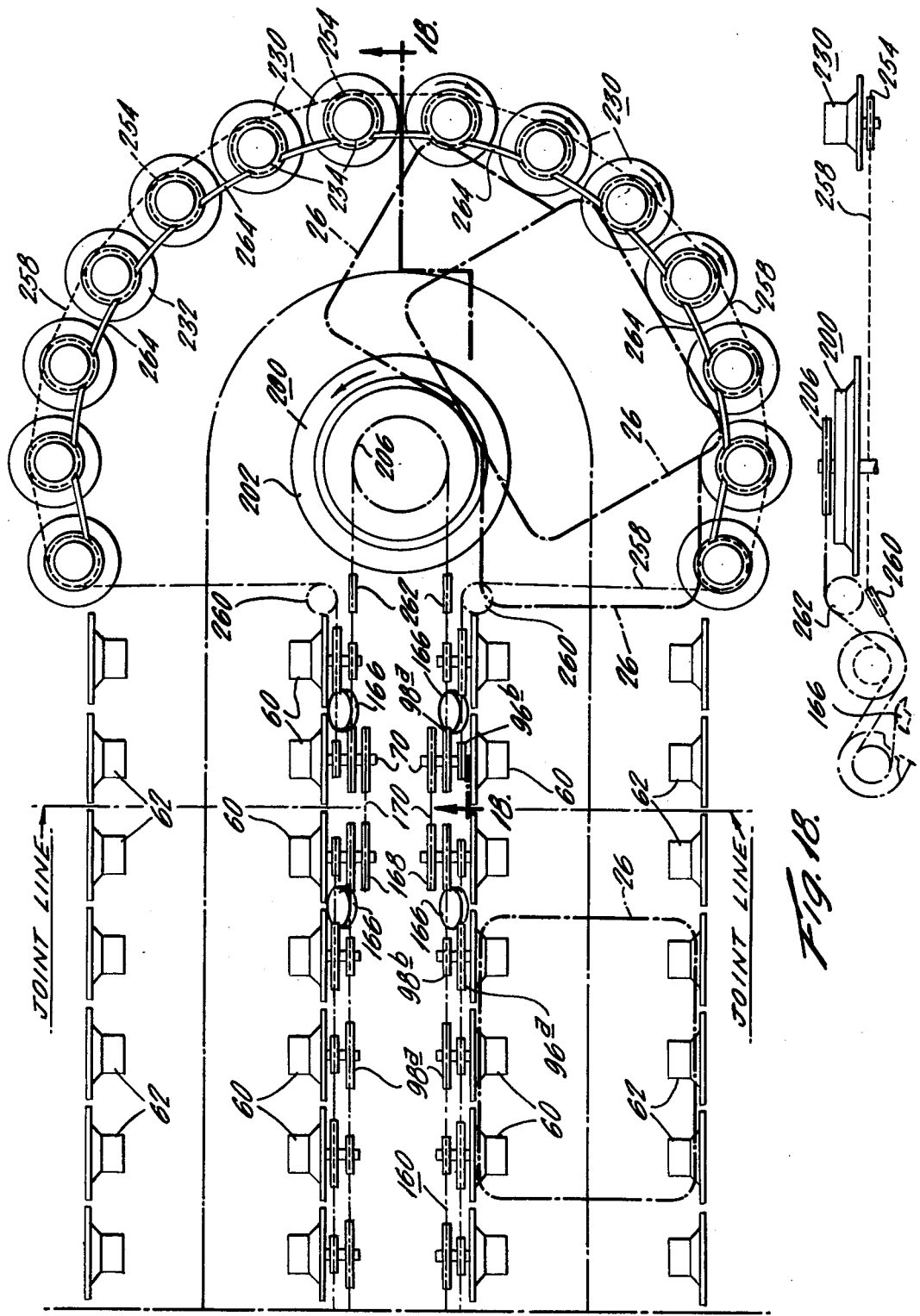

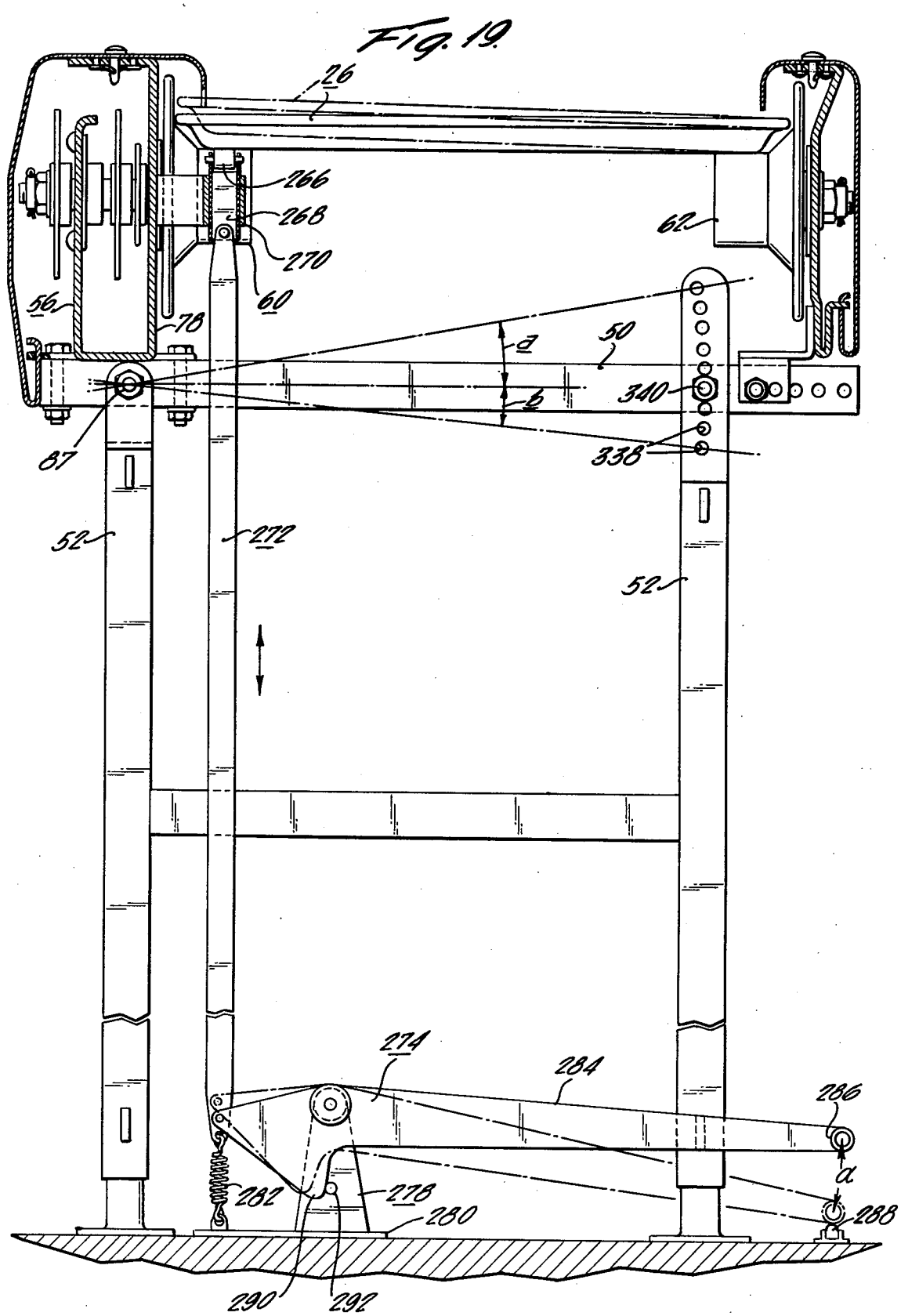

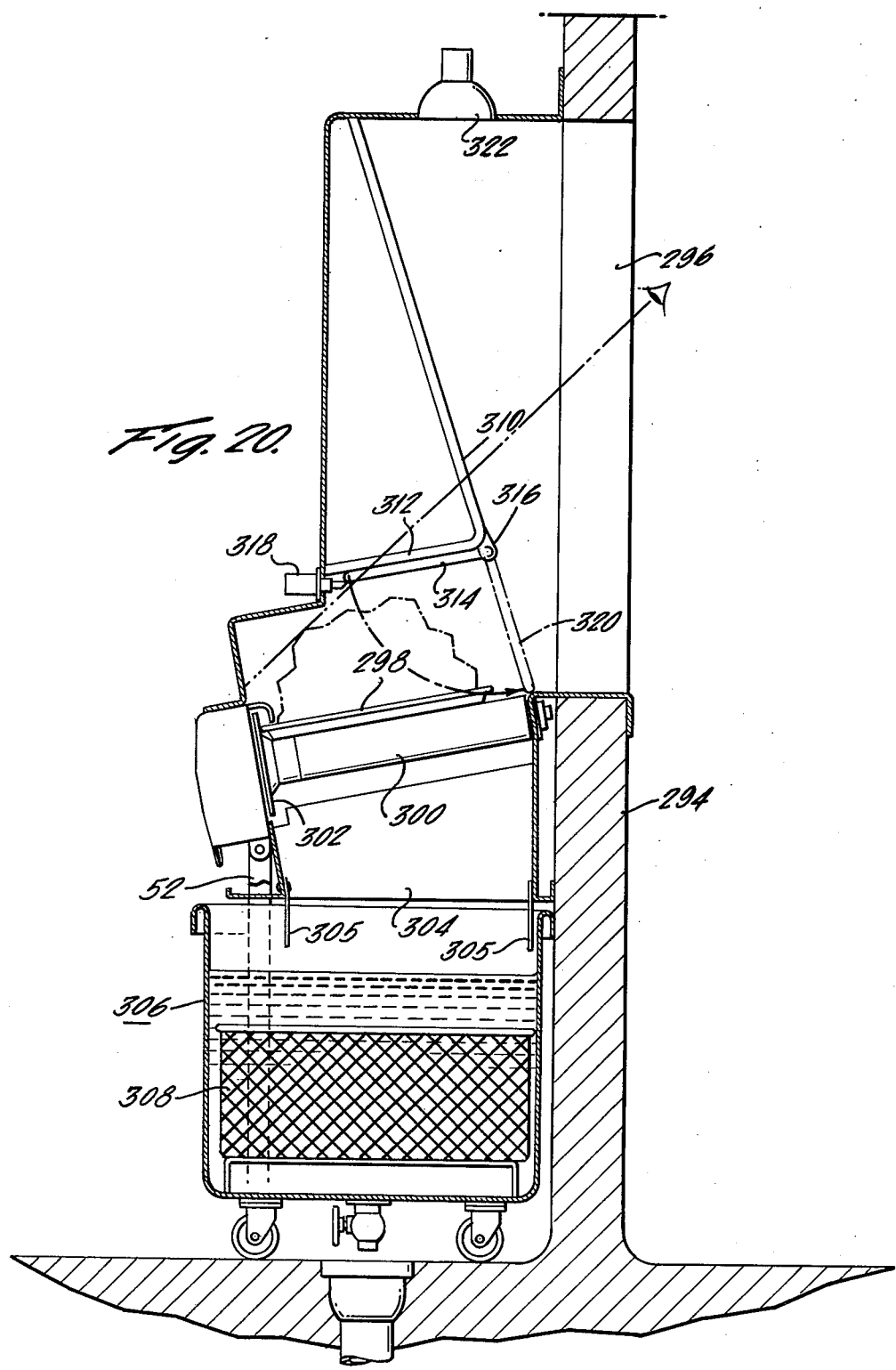

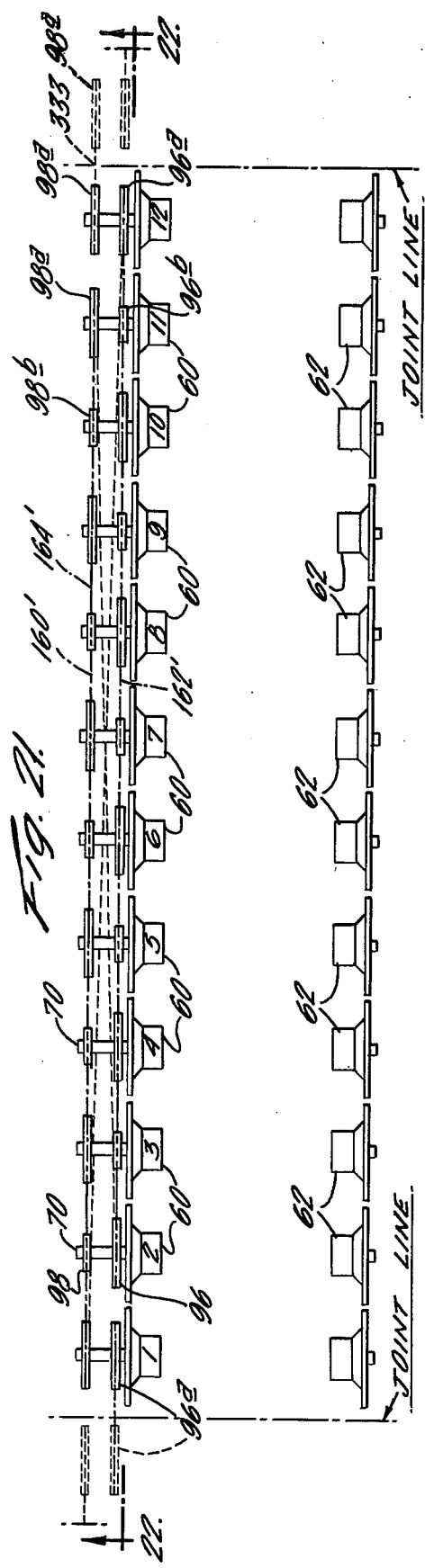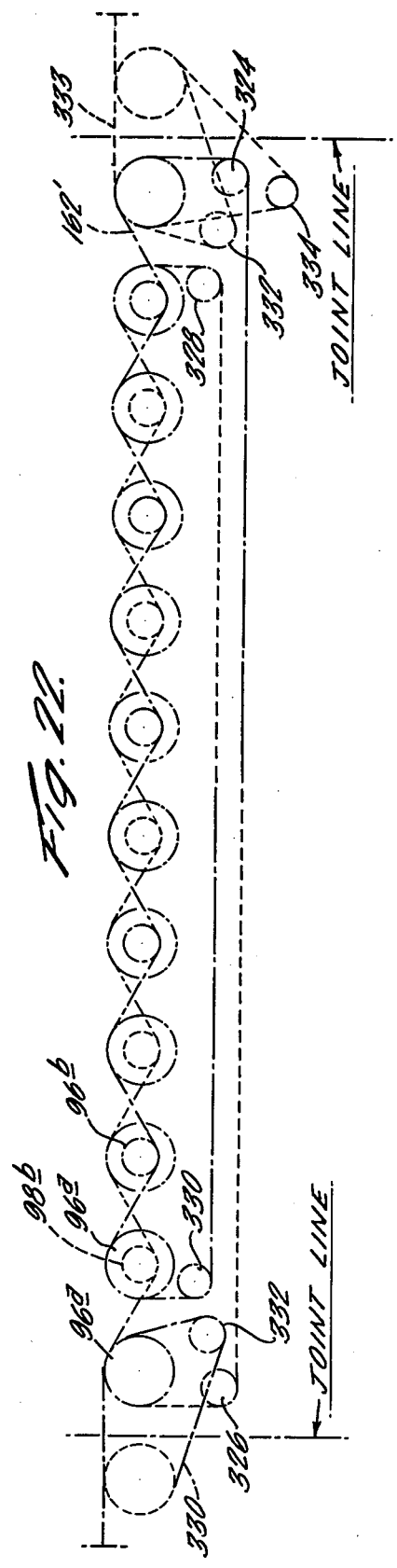

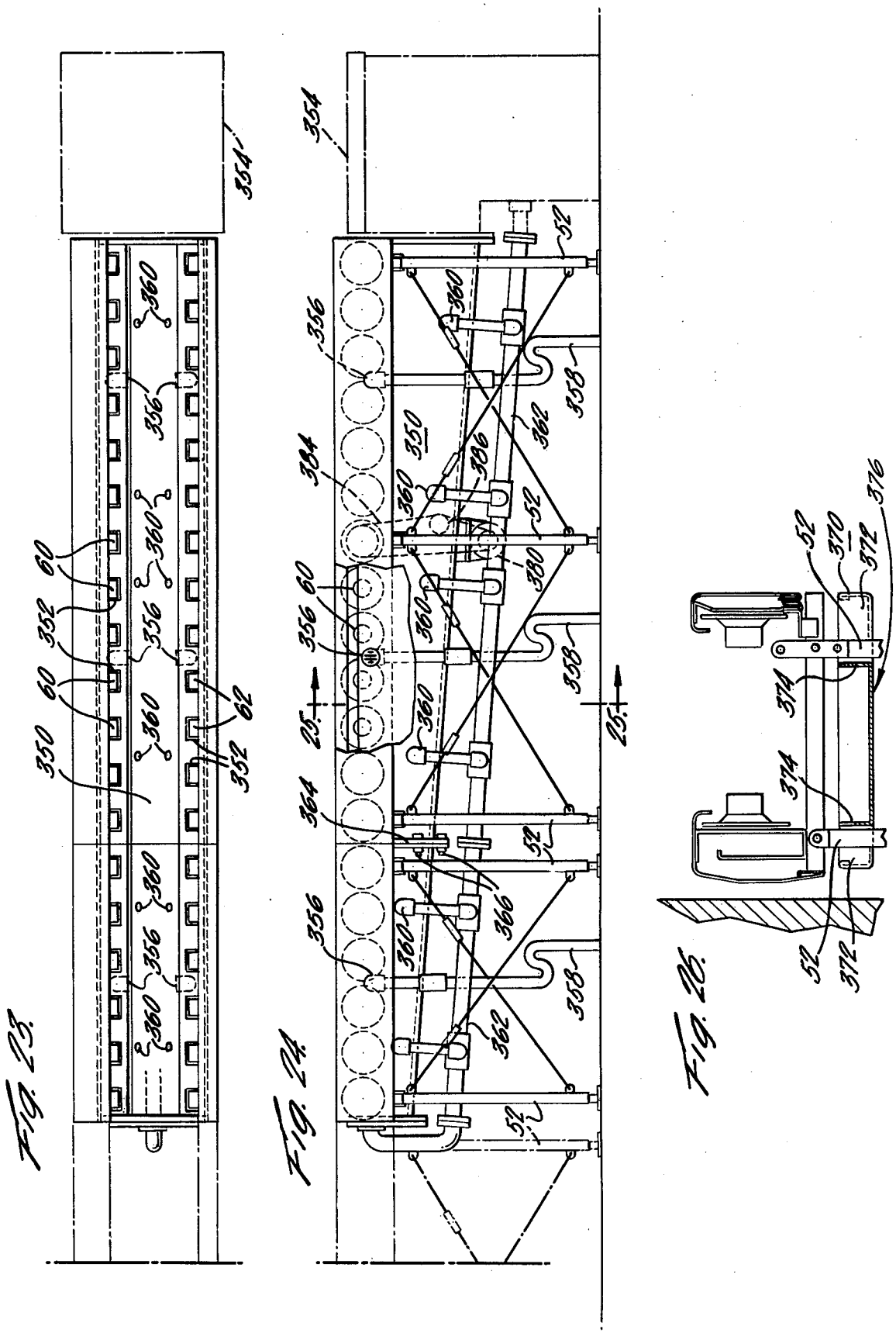

CONVEYOR SYSTEM

BACKGROUND OF THE INVENTION

The present invention relates generally to conveyors for conveying cafeteria trays, waiter/waitress trays, pallets, dish boxes, dish racks or like articles and relates more particularly to a modular conveyor system for mechanized foodservice installations such as cafeterias for the removal of trays loaded with soiled dishes, glasses, trash, garbage, silverware (flatware) and the like from a dining area for delivery to a dish and tray washing and storage area, said conveyor system being reversible to return clean items to their point of use.

Although the present conveyor system and particularly the drive arrangement thereof will have utility in other fields, it was developed primarily for foodservice applications and specifically to provide an inexpensive and versatile modular conveyor system for conveying loaded trays in either direction and at variable speeds. Accordingly, the following discussion and description thereof will be directed primarily to the conveying of trays of the type widely used for foodservice; however, it will be apparent that other types of trays, boxes, pallets or other rigid objects could also be conveyed by the present system.

The commercially available tray conveying systems for use in foodservice are extremely expensive, largely due to their complex construction which requires individual one of a kind engineering/custom fabrication and involved installation steps. Most of the types presently sold comprise belts driven over rollers or are of the slat or pallet type wherein a chain drive system moves parallel slats or pallets on which the trays are disposed along the conveyor path. These systems due to the frictional drag of the belts or pallets require substantial amounts of power and accordingly must utilize large, heavy and expensive drive components.

Conveyors for foodservice use are subject to the interrupting influence of dishes, silverware and food particles which inadvertently tumble from the trays and tend to become lodged in operating elements of the conveyor mechanism. The slat or pallet type conveyor is particularly subject to difficulties of this type, particularly with silverware which tends to fall between and break up the slats, requiring continual, expensive replacement and repairs.

Since foodservice conveyors generally must move trays from a dining area to a remote dish, silverware and tray cleaning and storage area, the conveyor may pass through several rooms or work areas, in the course of which it must often make turns, and/or ascend or descend to most efficiently utilize the space available. In some instances, the conveyors actually ascend or descend to different floors of a building, which with presently available conveyor systems requires custom engineering and custom fabrication, resulting in a very expensive and space consuming installation.

The complexity of available foodservice conveyors further makes them difficult to clean as well as to maintain. Their complexity results in high maintenance costs and a breakdown of one part can shut the entire conveyor down for substantial periods until the parts and highly skilled labor are available to effect the necessary repairs. Furthermore, the typical commercially available slat type conveyor, although capable of traversing curves, is not reversible and its function is accordingly limited to delivery of trays in one direction only. Although belt type conveyors may be reversed, they are incapable of traversing curves.

Many of the problems associated with conventional conveyors flow from the provision in such conveyor constructions of a belt or a surface comprised of slats or pallets moving the entire length of the conveyo on which the loaded trays ride, plus the return of empty belts or slats the full length of the conveyor. Even in the absence of any trays on such a conveyor, a substantial amount of energy is expended, to overcome friction, in moving the large inertial mass of the conveying platform along the length and return of the conveyor. It is furthermore difficult to stop the progress of a tray on a conveyor of this type since the entire surface on which the tray is resting is in continual movement, making unloading of the trays a difficult operation. Because of friction and spillage, the conventional conveyors require dishwasher machine type belts or pallet washing devices to keep the belts or pallets clean. These washing devices require extensive hot and cold water, drains, and detergent use, with excess detergent being used to help reduce friction; they are thus costly and require constant surveillance.

Because commercially available conveyor systems employ both belt and pallet type drive neither of which can radius upward or downward, the joining of a level section to a slanted section results in a sharp abrupt angle, which creates tray jarring action as the tray passes over such abrupt joint. This tray jarring causes spillage of the tray contents together with excessive noise, vibration, and the telescoping of trays one into the other.

BRIEF SUMMARY OF THE INVENTION

In the present conveyor, the conventional moving belt or slats have been eliminated and the trays travel along spaced parallel sets of rollers, one set of which may comprise drive rollers while the other may comprise idler rollers. Since there is no continuous conveyor element to be accommodated, the conveyor can be made in relatively short modular sections which can be factory assembled and very quickly installed. The present conveyor is particularly adapted for curved conveyor paths as well as smooth ascending or descending transition configurations, which meeting points in conventional custom made conveyor types cause tray jarring, spilling of tray contents, noise, vibration, and telescoping of trays one into the other, all of which are serious and expensive complications.

An important aspect of the present invention is the drive arrangement for the drive rollers whereby all of the drive rollers of a given conveyor section are positively driven in the same direction and at the same speed by an endless belt. The drive shaft of each drive roller includes first and second spaced sprocket wheels, one of which is fixed to the drive shaft and the other which is freely rotatable with respect thereto. A first flight of said endless belt passes alternately over and under the first sprocket wheels of the drive rollers while the second flight of the endless belt passes alternately over and under the second sprocket wheels. Each flight of the endless belt alternately encounters a drive sprocket wheel fixed to the roller shaft followed by an idler sprocket wheel not attached to the roller shaft and accordingly drives every other drive roller. Aside from an idler wheel at each end of the conveyor section to transfer the endless belt to the other side of sprockets, the conveyor drive arrangement requires only the drive roller assemblies, each of which are substantially identical.

The conveyor sections are driven by drive motors connected with any convenient one of the drive roller shafts and it is not necessar that each conveyor section have a drive motor. One conveyor section can be quite readily driven by an adjoining section and it is accordingly expected that a single drive motor will drive several conveyor sections. It is intended that each of the drive motors be fitted with variable speed controls, and reversing mechanism.

By utilizing light weight moldings for the drive and idler rollers as well as light weight drive belts and sprocket wheels, the conveyor sections can be extremely light, reducing the manufacturing cost, the size and the cost of the conveyor supporting elements as well as shipping costs, and more importantly, reducing the power required to drive the drive rollers.

The invention includes a novel turning station which is adapted to produce relatively sharp turns of the tray path up to 180°. Other features of the invention include a tray accumulator whereby the tray motion can selectively stop to permit unloading of the trays. Also included is a tray loading station which includes means for preventing the double stacking of trays on the conveyor.

It is accordingly a first object of the invention to provide a simple, inexpensive conveyor for conveying trays, pallets or other articles which can be manufactured in modular, readily joined sections.

Another object of the invention is to provide a conveyor construction as described which is readily adaptable for curved, ascending or descending configurations.

A further object of the invention is to provide a conveyor as described of a light weight construction requiring low power input and which will require little maintenance.

Still another object of the invention is to provide a conveyor as described which during operation will produce a minimal amount of vibration or noise.

A still further object of the invention is to provide conveyor as described wherein the direction of tray travel can be selectively reversed, or the speeds of individual sections can be selectively controlled.

Another object of the invention is to eliminate the dishwashing type belt or pallet washing devices and the inherent high cost of hot and cold water, drains, detergent, maintenance costs and constant surveillance necessary with conventional conveying equipment.

A further object of the invention is to provide a conveyor described which is easily cleaned, and which is not subject to interruption due to the jamming of trays or conveyed articles in the mechanism thereof.

An additional object of the invention is to provide a conveyor as described wherein the tray path can be configured in relatively sharp turns.

A still further object of the invention is to provide a conveyor as described which includes a tray loading station preventing the overlapped loading of trays and a tray unloading station which permits the trays to be selectively stopped as needed to faciliate the unloading process.

Another object of the invention is to provide a conveyor as described including means along the entire length of the conveyor for preventing the telescoping of one tray onto another.

A additional object of the invention is to provide a conveyor as described adaptable for the central installation of a swill trough which permits the emptying of the trays between the tray edge supporting rolls.

A further object of the invention is to provide a conveyor as described which can be readily provided with drip trays as may be required where the conveyor passes over doorways or other occupied areas.

Additional objects and advantages of the invention will be more readily apparent from the following detailed description of an embodiment thereof.

BRIEF DESCRIPTION OF THE DRAWINGS

FIGS. 1a and 1b are a divided side elevational view of a modular conveyor system in accordance with the present invention illustrating schematically the manner in which the conveyor is adapted to ascend or descend to various levels;

FIGS. 2a and 2b are a divided plan view of the conveyor shown in FIGS. 1a and 1b and additionally illustrate the capability of the conveyor to negotiate turns of a large or small diameter;

FIG. 3 is an enlarged elevational view taken along line 3—3 of FIG. 2a showing several modular sections of the conveyo including a straight and level conveyor section as well as an ascending transition section;

FIG. 4 is a plan view of the conveyor shown in FIG. 3 taken along the lines 4—4 thereof;

FIG. 5 is a perspective view of a tray of a type which ma be suitably used with the present conveyor;

FIG. 6 is a end view of a conveyor section taken along line 6—6 of FIG. 3 showing the manner in which a portion of the conveyor may be secured to a wall, and the manner in which the conveyor section can be tilted;

FIG. 7 is an enlarged sectional view taken along line 7—7 of FIG. 3 showing the motor drive arrangement for a typical conveyor section and also showing in broken lines the crossover drive arrangement for transferring the conveyor drive from one side of the conveyor to the other;

FIG. 8 is an enlarged sectional view of the conveyor drive arrangement as shown in the upper left hand corner of FIG. 7;

FIG. 9 is an enlarged end view taken along line 9—9 of FIG. 8 showing a configuration of the end of the drive roller;

FIG. 10 is a partially cutaway end sectional view showing the details of a crossover drive assembly;

FIG. 11 is an enlarged sectional view taken along line 11—11 of FIG. 10;

FIG. 12 is a schematic plan view of a typical conveyor section and including at each end thereof portions of adjoining conveyor sections;

FIG. 13 is a schematic elevational view taken along line 13—13 of FIG. 12 showing the conveyor drive arrangement;

FIG. 14 is an enlarged partial side elevational view showing the portions of the preferred type of sprocket and drive belt;

FIG. 15 is a view taken along line 15—15 of FIG. 14 showing details of the preferred drive belt;

FIG. 15a is a sectional view taken along line 15a—15a of FIG. 15;

FIG. 17 is a somewhat schematic plan view of the turning station shown in FIG. 16;

FIG. 18 is a schematic partial side elevational view of the drive mechanism of the turning station shown in FIG. 17;

FIG. 19 is a transverse sectional view showing a tray unloading station and an accumulator assembly for selectively stopping the tray movement during unloading thereof;

FIG. 20 is a transverse sectional view of a conveyor loading station showing an arrangement for catching loose items and the prevention of double decking of full trays;

FIG. 21 is a schematic plan view of a conveyor section showing a modified form of conveyor drive arrangement;

FIG. 22 is a schematic side elevational view of the drive mechanism shown in FIG. 21;

FIG. 23 is a plan view showing the manner in which a swill trough can be added between the conveyor rollers at the tray emptying station to permit the glasses, cups, dishes to be scraped into a swill trough directly below the tray travel path, and the trays to be emptied by a simple up-ending maneuver;

FIG. 24 is a side elevational view of the swill trough shown in FIG. 23;

FIG. 26 is a sectional view showing the manner in which a drip pan can be added to a conveyor section to catch items which might fall from the conveyed trays.

DESCRIPTION OF THE PREFERRED EMBODIMENT

Figure 16:
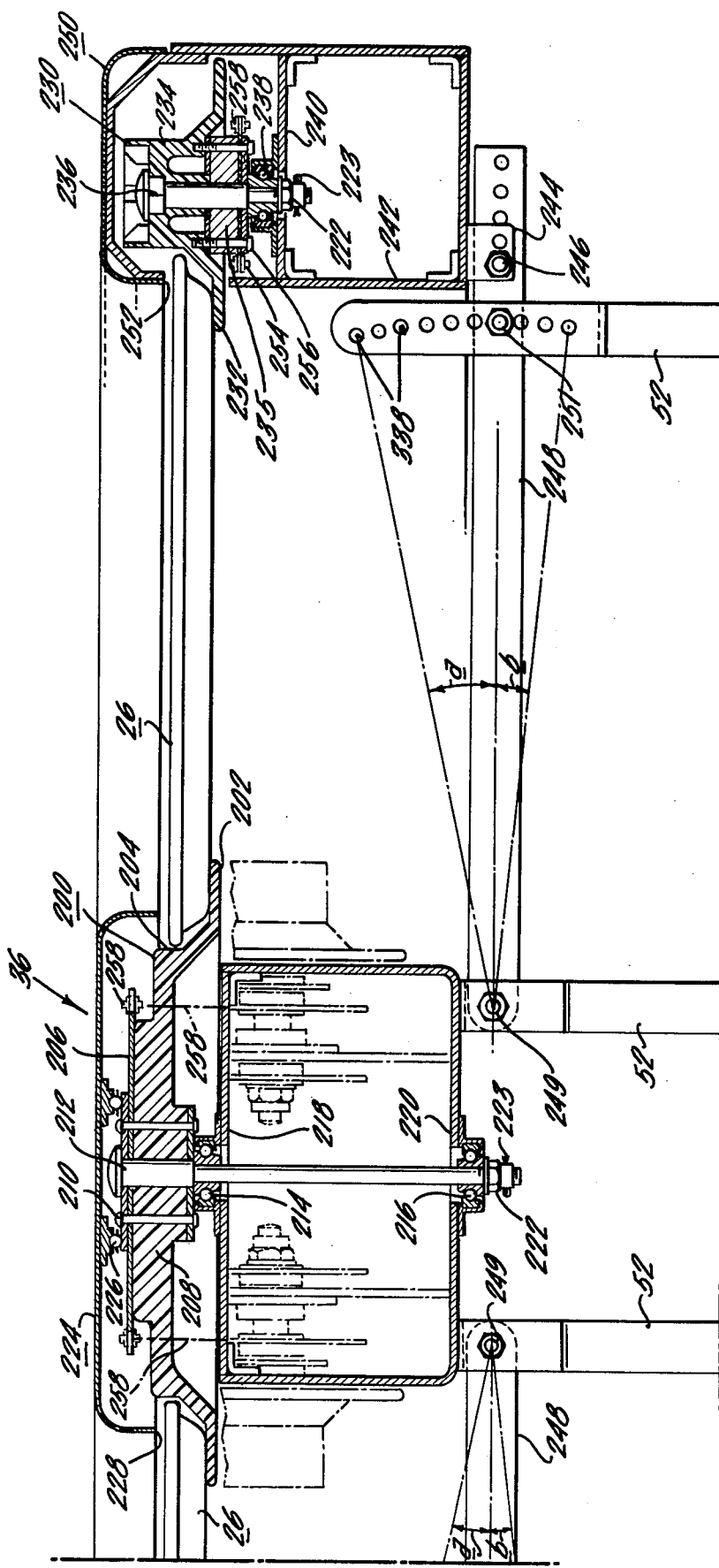
FIG. 16 is a sectional elevational view taken along line 16—16 of FIG. 2b showing details of the turning station.

Referring to the drawings and particularly FIGS. 1a, 1b, 2a and 2b thereof, a modular conveyor system generally designated 24 is schematically illustrated to show the variety of configurations which are possible with the present conveyor construction. The conveyor system illustrated is set up to convey trays 26 of the type shown in FIG. 5 and might typically be used in cafeterias such as in corporate buildings, hospitals, colleges, etc. to convey trays bearing dishes, silverware and the like from a tray loading station to a tray and dish washing station and return clean dishes and the like to the point of use. The schematic system views show that the conveyor may comprise straight sections 28 which may be either level, inclined or twisted, curved inclined or curved level sections such as 30 having a relatively large diameter of curvature, twisting inclined curved sections such as 32, transition sections 34 for joining level with inclined sections, and turning stations 36 for relatively tight conveyor turns of up to 180°.

All of the conveyor sections are reversible in drive direction and the entire conveyor may accordingly be instantaneously stopped and reversed should circumstances require a change in the flow of the conveyed trays. Rheostats on the drive motors provide variable speed to each individual drive section thereby controlling the speed and providing the ability to make changes in the speed of travel of the trays through various sections of the conveyor.

The modular conveyor sections are driven by electric motors schematically shown at 38 and it will be apparent that not every section need have its own drive motor. It is preferred that drive motors be provided only with the straight conveyor sections 28 and that the transition sections and curved sections be driven by means of their connection to a straight section. Since it is anticipated that the modular conveyor sections will be assembled prior to shipment to the installation site, the sections are relatively short, preferably eight feet or less, to permit their ready passage through elevators, corridors and doorways. Because of the simplicity of the conveyor drive arrangements, and the interconnection of the conveyor sections, the conveyor installation can be accomplished relatively quickly and by relatively inexperienced persons. The light weight construction of the conveyor permits the support of the conveyor sections either on the floor, along a wall, or from a ceiling trapeze fashion, whichever may be most convenient.

Of particular interest is the ease with which the conveyor can ascend or descend, as may be required between floors of a building or to pass over obstructions such as doorways, pipe ducts, columns or the like. In FIGS. 1a, 1b, 2a and 2b are illustrated four different arrangements for the ascent of the conveyor system, the simplest being a straight ascending or descending run of the conveyor as shown at the right hand end of FIGS. 1a and 2a and left hand end of FIGS. 1b and 2b which enables the conveyor to clear a doorway 40. A rectangular ascending or descending conveyor flight is shown toward the left hand side of FIGS. 1a and 2a wherein straight conveyor sections 28 and transition sections 34 are joined with 90° twisted inclined curved sections 32 to produce the substantially rectangular spiral 42 which allows the conveyor to pass from floor to floor as illustrated.

A further ascending or descending conveyor arrangement is shown at 44 in FIGS. 1b and 2b wherein straight inclined sections 28 are coupled by means of transition sections 34 with turning stations 36 to produce a very compact ascending or descending arrangement permitting close rectangular steel building construction, particularly in contrast with the arrangement 42 which requires considerably more space, and larger rectangular steel building framing.

Still another arrangement 46 is shown at the right hand end of FIGS. 1b and 2b wherein a continuous spiral is formed by the joining of a number of twisted inclined curve sections 32 and transition sections 34. This also produces a very compact, space-saving installation permitting small square, steel building framing.

The trays 26 illustrated are of the typical plastic construction widely utilized in cafeterias, the trays including raised reinforced edges 26a which serve the multiple purpose of preventing dishes and other carried items from slipping from the tray surface and also providing convenient hand grips by means of which the tray can be lifted from a planar surface and comfortably carried.

Although the tray 26 illustrated in FIG. 5 and in the other views of the preferred embodiment are rectangular in shape, it will be apparent that the present conveyor can be utilized with trays of many other shapes including hexagonal, oval, round, boat shaped, as well as box shaped trays of various configurations having raised sides for accommodating larger numbers of articles. It will further be apparent that the conveyor can also be used with flat pallets on which articles to be conveyed are loaded, or even for the conveying of articles themselves of appropriate shape, for instance in a manufacturing plant. Accordingly, although the term "tray" will be used in describing the preferred embodiment, it should be kept in mind that the term is used in a broad sense to encompass not only trays of a variety of shapes, but also pallets, and other articles having sufficient rigidity and surfaces appropriate for engagement by the conveying rollers of the present system.

With trays having their upper surfaces coated with an anti-skid rubber-like layer, it is possible to incline the trays as much as 19° or 20° without the sliding displacement of the dishes and flatware. The ascending and descending conveyor sections are accordingly shown with maximized angle of inclination to illustrate the capabilities of the conveyor system utilizing such trays. With uncoated tray surfaces, the permissible angle of inclination is more on the order of 6°.

Considering the details of the conveyor sections, with reference to FIGS. 3, 4 and 6 a typical conveyor construction is shown to include, in a straight conveyor section 28, a frame assembly generally designated 48 including transverse frame members 50 supported by legs 52 and adjustable wire leg braces 54. Spaced, parallel longitudinal frame members 56 and 58 are secured to the transverse frame member 50 a shown in FIG. 6 and in greater detail in FIG. 7. The transverse frame members 50 will be made in various lengths to accommodate more than one width of item conveyed. The longitudinal frame member 56 supports a plurality of spaced drive rollers 60 each of which is driven in rotation in the same direction, while the frame member 58 supports a plurality of spaced idler rollers 62. The trays 26 are accordingly supported successively by the individual drive and idler rollers 60 and 62 and there are accordingly no moving conveyor elements such as belts, slats or other mechanism, the movement of which requires in conventional conveyors a substantial expenditure in terms of energy, lubrication, and maintenance. The area between the rollers 60 and 62 is, in the absence of trays passing through a given section, open space, resulting in a very light weight conveyor construction and greatly simplifying the clean up of the conveyor and the space surrounding the conveyor as required at frequent intervals in foodservice installations.

FIG. 6 shows the angle "a" through which the transverse frame cross member 50 may selectively be adjusted upwardly and the angle "b" through which it may be adjusted downwardly to provide tilting of the entire conveyor assembly.

The drive rollers 60 and the idler rollers 62 are identical in construction although the mounting is somewhat different. The rollers preferably comprise a molded plastic member including a cylindrical tray support surface 64 and an annular flange 66 joined thereto by beveled portion 68. As shown in FIG. 7, the rollers 60 and 62 support the tray 26 by engagement of the cylindrical surface 64 of the rollers with the bottom of the tray adjacent the side edges of the tray. The flanges 66 serve as guides to maintain the proper path of the tray and, in the case of the drive rollers 60, also serve to impart forward motion to the tray. It is recognized that the flange portion 66 will be moving in a vertical plane and accordingly describing arcuate motions with respect to the tray which is moving in horizontal plane in FIG. 7 and accordingly there will be some slippage of the flange surfaces with respect to the tray edges. However, since the tray edges will be in only incidental contact with the flanges, the flanges will slip easily along the tray edges without creating any difficulties or significant power loss. The moulded drive rollers 60 and idler rollers 62 and central drive wheel 200 are preferably of a relatively soft polyurethane material to insure quietness. A non-skid finish is preferably provided on the tray support roller surfaces 64, the roller beveled portion 68 and the annular frame surface 66 and all like driving surfaces to provide a positive grip onto the smooth bottom of the trays 26, pallets and the like. Likewise, the surfaces of drive flange 202 and annular shoulder 204 and beveled surfaces on central drive wheel 200 will be provided with a non-skid finish.

Each drive roller 60 is mounted on a drive shaft 70 in the form of a carriage bolt passing through a bore 72 therein concentric with cylindrical surface 64. The head 74 of the bolt comprising the drive shaft is recessed within the counterbore 76 of the roller. The square section of the carriage bolt 70 provides positive drive to the drive roller 60 as well as to all like drive units.

The longitudinal frame member 56 supporting the drive rolls and the drive arrangement therefor is of a generally U-shaped configuration having upstanding frame elements 78 and 80 disposed in spaced parallel relation. Ears 82 and 84 extending from the opposite sides of the frame member 56 are secured to the frame cross member 50 by bolts 86 to secure the frame member 56 to the rest of the frame assembly. Bolt 87 through leg 52 provides support for cross arm 50 and provides a pivot point for tilting the conveyor.

The drive rolls 60 are rotatably secured to the frame member 56 by the passage of the drive shaft 70 through holes 88 and 90 in the frame elements 78 and 80. Bearing assemblies 92 and 94 secured by rivets to the frame elements 78 and 80 support the drive shaft 70 for rotary movement about a substantially horizontal axis, although it may be advantageous under certain circumstances to tilt the conveyor.

To provide a rotary drive of each drive roller 60, first and second drive wheels which in the preferred embodiment of the invention comprise sprocket wheels 96 and 98 are mounted on the drive shaft 70. One of the sprocket wheels 98 is fixed to the drive shaft for rotation therewith while the other sprocket wheel 96 is freely rotatable on the shaft. Accordingly, one of the sprocket wheels will comprise a drive sprocket wheel 98 while the other will serve as an idler 96, which arrangement will be more readily understood from the following description of the drive arrangement for each conveyor section. In the case of the particular drive roll shown in FIG. 8 the sprocket wheel 96 is rotatable on the drive shaft 70, being mounted on a bearing 100. The sprocket wheel 98, on the other hand, serves as a drive sprocket and is accordingly fixed to the drive shaft 70 by means of a key 102 disposed within a keyway 104 of the drive shaft 70 and a similar keyway within the hub of the drive sprocket 98.

In the illustrated embodiment, the idler sprocket wheels are of a smaller diameter than the drive sprocket wheels, primarily for convenience in illustration, particularly in the side elevational views of the conveyor sections. However, the idler and drive sprocket wheels could be of the same diameter or in any other proportion desired.

The power input to a motorized section of the conveyor is carried out by adding to one of the drive shafts 70 a third or power input sprocket wheel 106 toward the outer end of the drive shaft which is keyed to the drive shaft by a key 108. The entire assembly of the drive roller, idler sprocket, drive sprocket and the power input sprocket are conveniently secured axially in position on the drive shaft by means of a castellated nut 110 and a locking pin 112, the nut being screwed onto a threaded outer end of the drive shaft. Spacing bushings 114 may be provided as necessary between the various drive shaft bearings and the sprocket wheel hubs to provide clearance between the sprocket wheels and the upstanding frame members.

A motor 116 is suspended beneath a frame transverse member 50 by means of motor brackets 118. A sprocket wheel 120 mounted on the motor drive shaft aligns with the power input sprocket wheel 106 and is connected thereto by means of the power input drive belt 122. An idler 123 is provided in the run of drive belt 122 for belt tension adjustments. If the conveyor is to be utilized under circumstances in which reversal of the conveyor direction is desired, the drive motors 116 and the motor control circuits should be selected accordingly. Similarly, if the conveyor speed is for any reason to be varied during certain periods of operation, or for progressive speeding of one or more sections of the conveyor; the selection of motors and control circuits for this purpos should also be made.

The frame member 58 which supports the idler rolls 62 comprises a single upstanding member having spaced holes 124 therein through which pass the support shafts 126 of the idler rolls 62, said support shafts comprising carriage bolts extending through the coaxial bores of the rolls in a manner similar to that of the drive shaft 70 of the drive rolls 60. The support shafts 126 are journalled by bearings 128 secured to the frame member 58 and the idler rolls are held in position against the bearings by means of castellated nuts 130 and locking pins 132 cooperating with the threaded end of the support shafts. It is apparent that for heavier loading the frame 58 could be designed like the longitudinal frame 56 having a U-shaped configuration and two bearing assemblies.

The frame member 58 is attached to the transverse frame cross members 50 by means of brackets 134 at the lower edge thereof, said brackets preferably including holes 136 therein, one of which can be aligned with one of the holes 138 in the transverse frame member 50 to permit passage of a bolt 140 to fix the support frame 58 in the desired transverse spacing from the support frame 56. The spacing of the holes 136 is preferably slightly different than the spacing of holes 138, providing a vernier effect which permits a close adjustment of the position of the frame support member 58.

In order to prevent the trays from becoming overlapped during travel along the conveyor, tray holddown means are provided along each side of the tray path to prevent the edges from lifting any substantial distance above the roller tray support surfaces 64. These tray hold-down means comprise the respective inner edges 142 and 144 of the conveyor side covers 146 and 148 in the preferred embodiment of the invention. The covers 146 and 148, which may be formed of sheet metal, are of a substantially inverted L-shape and extend longitudinally full length along and above the conveyor frame support members 56 and 58, partially covering the drive and idler rollers and covering the roller shafts, sprocket wheels, and drive belts of the drive mechanism. The drive cover 148 includes spaced lower tang portions 150 passing through slots in the ears 82 which, upon release of the aircraft type quick release fastenings 152 at the top of the cover, permit the pivotal opening of the cover to reveal the mechanism enclosed therewithin.

The tangs 150 support the cover in the open position to allow inspection and servicing of the mechanism without the loss or damage of the cover 148.

Similarly, the idler cover 146 includes tang portions 154 passing through slots in an outwardly directed flange portion 156 of the frame support member 58. The release of quick release fastening 152 at the top of the idler cover 146 similarly permits a pivotal opening of the cover to gain access to the idler roll mechanisms without the loss or damage of the cover 146.

The drive arrangement which provides a simple positive drive of all of the drive rollers in the same direction may be best understood by reference to the schematic views of FIGS. 12 and 13, keeping in mind the specific conveyor structure shown in and described with respect to FIGS. 7 and 8. In FIGS. 12 and 13 a straight conveyor section having thirteen drive rolls 60 is shown with the drive rolls all being driven in rotation in a clockwise direction as viewed in the elevational view of FIG. 13. This will result in a tray transported therealong being delivered in a right hand direction as indicated by the arrow in FIG. 12. The power input to the conveyor section is derived from a motor beneath the conveyor run driving the sprocket 120, belt 122 the tension adjustment idler 123 and the power drive sprocket 106 (FIG. 12). This provides drive of the drive shaft 70 of the central drive roll 60 with which the power sprocket wheel is associated.

A positive drive of the other twelve drive rollers of the conveyor section is effected by means of an endless drive belt 160 which traverses the length of the conveyor section in two flights, a first flight 162 passing alternately over and under the first sprocket wheels on said drive shaft 70, and a second flight 164 passing over and under the second sprocket wheels of said drive shafts; such belt drive is working, going and returning, thereby balancing the load equally along the full run of the belt drive. As shown in FIG. 12, the first sprocket wheels 96 of the drive shafts of the thirteen drive rollers of the conveyor section are substantially aligned and form a first set of wheels for engagement by the first flight 162 of the drive belt. Similarly, the second drive sprockets 98 on the drive shafts of the conveyor section form a second set of wheels which are engaged by the flight 164 of the endless belt 160.

Although there are first and second sprocket wheels on each drive shaft, as indicated above, only one of these wheels is fixed to the shaft, the other being journalled by a bearing in the manner shown in FIG. 8 and thus comprises an idler. Furthermore, as explained above, the idlers for purposes of illustration are shown as of smaller diameter than the drive sprocket wheels. To further facilitate an understanding of the invention, the first or second drive wheels of the conveyor section will be designated as 96a or 98a if they are drive wheels, and will be designated 96b or 98b if they are idler wheels.

It will accordingly be apparent that in order to drive each of the drive rollers in the same direction, each flight of the endless belt must pass alternately under or over a drive sprocket wheel followed by an idler sprocket wheel followed by a drive sprocket wheel etc. Each flight of the endless belt will accordingly drive every other drive shaft and drive roller in rotation. Considering the specific conveyor section of FIGS. 12 and 13 the endless belt 160 and specifically the flight 164 thereof passing around the second set of sprocket wheels is powered by its passage over the drive sprocket 98a on the central drive shaft 70 driven from the motor sprocket 120 by means of the power input belt 122, the idler tension sprocket 123 and the power drive sprocket 106. This flight 164 will thus drive every other drive roller of the section, or, considered from left to right, the first, third, fifth, seventh, ninth, eleventh and thirteenth rollers. Flight 162 will in its turn drive the remaining rollers, namely the twelfth, tenth, eighth, sixth, fourth and second rolls by driving engagement with the drive sprockets 96a associated therewith. The endless chain 160 at each end of the conveyor section passes around idler rolls 166 which serve to transfer the endless belt from one flight to the other. For this purpose, the idlers 166 are inclined at a suitable angle to shift the belt transversely from one set of sprocket wheels to the other. These idler sprocket wheels 166 also provide proper tension to the endless belt 160.

The drive shaft of the end drive roller of each conveyor section may be provided with a third sprocket wheel 168 by means of which a transfer belt passing around a similar third sprocket wheel 168 of the adjoining conveyor section may transfer power to that section which may not have its own power drive. As indicated above, it is not necessary that each conveyor section have its own motor drive and, in fact, it is preferred that the transition sections and the curved sections be driven from an adjoining straight section. Depending on the loads to be conveyed, it may be possible to have a single motorized conveyor section for driving several adjoining conveyor sections. An idler sprocket wheel 172 is provided to properly tension the transfer drive belt 170 as shown in FIG. 13.

Although it will be apparent that various types of drive and idler wheels and drive belts could be employed with the present conveyor drive arrangement, a preferred type of belt and sprocket wheel is that manufactured and sold by Winfred M. Berg Inc. of East Rockaway, LI, N.Y. under the trademark MAX E PITCH. This system features a rollerless chain comprised of parallel flexible cables joined by plastic links which engage the sprockets of the wheels. This system is preferred because of its silent operation, its extremely low friction, light weight and its resistance to corrosion. Furthermore, the system requires no lubrication and accordingly virtually no maintenance. FIGS. 14 and 15 show samples of a drive belt 160 in accordance with the system and in particular the parallel plastic covered cables 160a joined by the transverse cable lugs 160b.

A further important advantage of utilizing this type of system is its ability to function without undue wear when applied to sprockets which are not in the exact planar alignment. As will be noted hereinafter, this is important since in some of the curved section of the conveyor, the adjacent sprocket wheels of a given set of such wheels are not rotated in the same plane.

A further advantage of the cable drive system preferred for the present conveyor is its ability to use very light weight sprocket wheels. In view of the plastic construction of the drive lugs, the sprocket wheels need not be of a heavy metal construction. The light weight of the sprocket wheels in view of the large number of wheels required results in a light overall weight of each conveyor section and further minimizes the rotational inertia of the system and the starting loads to be overcome by the drive motors.

In straight runs of the conveyor as illustrated in FIGS. 4 and 12, it is sufficient if the trays are driven by drive rollers on one side only of the tray path. However, on curves and possibly on certain relatively steep ascents, it is desirable that the rollers supporting both side edges of the tray be power driven. To transfer the power drive from one side of the conveyor to the other to enable a single drive motor to be employed, a crossover drive assembly 174 is provided as shown in FIG. 10 and in broken lines in FIG. 7. The crossover assembly 174 extends from a drive roll 60 on one side of the conveyor and imparts driving rotation to the counterpart roller on the opposite side of the conveyor which may then in turn be connected by sprockets and an endless belt to the other rollers on that side of the conveyor. The depiction of FIG. 7 is only to show the manner in which the crossover drive assembly fits between two opposed rollers and would not be used in the setting of FIG. 7 since the right hand roller is only an idler roller and thus could not transmit power to any adjoining rollers on that side of the conveyor. In a conveyor section in which the rollers of both sides of the conveyor were to be driven, the same frame and roller support and drive as shown on the left side of FIG. 7 would also be employed on the right hand side of the conveyor with the power generated by the motor and transmitted to the left hand side being transferred by means of the crossover assembly 174 to the right hand side.

As shown in FIG. 10, the crossover assembly includes a pair of hollow cylindrical members 176 and 178 the central necked down portions of which are in telescoping relation to permit the axial shortening or lengthening of the assembly to suit the width of the conveyor for which the assembly is used. A spring clip 180 as shown in FIG. 11 includes a short rivet 182 engaged in a hole 184 in the outer member and a long rivet 186 passing both through a hole 188 in the outer element and through a selected one of a plurality of holes 190 in the inner element which are arranged helically therearound to provide a wide variety of vernier type axial adjustments of the length of the assembly. The spring clip 180 may be quickly removed and adjusted with a screwdriver to allow a fast set up of the crossover assembly.

The outer ends of the crossover assembly members 176 and 178 include a plurality of ears 192 arranged at 90° intervals which are received within slots 194 molded into the inner ends of the rollers 60 and 62 adjacent the counterbore 76 thereof as shown in FIG. 9. The crossover assembly is accordingly held between the opposed rollers by the cooperation of the ears 192 and slots 194 which also serve to transmit torque between the rollers.

In FIGS. 16 and 17, the details of one of the conveyor turning stations 36 are illustrated. This type of turning station is adaptable to produce relatively sharp turns of up to 180° in substantially the same conveying plane. The turning station 36 preferably includes at both the input and output side thereof several conventional drive rolls and idler rolls arranged in the manner described in connection with the description of the straight conveyor section of FIGS. 3, 4 and 7 and 8. In the illustrated embodiment of FIGS. 16 and 17, the conveyor section comprising the turning station 36 includes a pair of conventional drive rolls 60 and idler rolls 62 at both the input and output runs thereof, particularly in order to facilitate the connection thereto of the other modular conveyor sections.

The turning station 36 comprises a relatively large central drive wheel 200 which is substantially horizontally disposed and includes a downwardly offset drive flange 202 for supporting the bottom of the conveyed trays along one side thereof. An annular shoulder 204 of the wheel 200 is arranged to engage the side edges of the trays and upon such engagement serve to advance the trays in the desired direction. The material of which drive wheel 200 is molded is preferably similar to that detailed above for drive roller 60 and idler roller 62.

The wheel 200 is part of a wheel assembly which includes a sprocket wheel 206 separated therefrom by spacers 208 and secured therewith by rivets 210. The wheel assembly is mounted by means of a bolt 212 for rotation on bearing assemblies 214 and 216 mounted on spaced transverse frame members 218 and 220. The wheel assembly is secured in position by castellated nut 222 and locking pin 223 cooperating with the threaded lower end of the bolt 212.

An annular cover 224 hinged at one side to the frame assembly is supported by means of bearings 226 on the rotating wheel assembly. The downwardly turned edge 228 of the cover 224 serves as tray holddown means, being spaced slightly above the normal position of a tray passing through the turning station to prevent a possible overlapping relation of adjacent trays from developing.

A plurality of closely spaced peripheral drive wheels 230 are disposed in a substantially arcuate arrangement with respect to the drive wheel 200 and are spaced therefrom a distance sufficient to enable a tray supported thereby and by the drive wheel 200 to negotiate the rather sharp turn as illustrated in FIG. 17. Each of the drive wheels 230 which are preferably identical in shape with the drive rollers and idler rollers 60 and 62, include a flange portion 232 for supporting the tray and a cylindrical surface 234 for engaging the edges of the tray. The peripheral drive wheels 230 each include a spacer 235 therebeneath and a central carriage bolt 236 extending therethrough and through the spacer and passing through a bearing 238 of a transverse portion 240 of a frame assembly 242. The frame assembly 242 in turn is mounted by means of ears 244 and bolts 246 to a cross bar 248 of the conveyor frame assembly, with the same vernier action bolting method as shown in FIG. 7. Cross bar 248 is pivotally mounted by bolt 249 to the supporting frame. Cross bar 248 will be provided in various lengths, to accommodate various widths of items to be conveyed, same as cross bar 90. Bolt 251 is adjustable in holes 338 of the supporting frame to permit selective vernier action tilting adjustment of the turning station. This vernier action tilting adjustment feature is typical throughout the other conveyor sections.

A cove 250 enclosing the major part of the peripheral drive wheels 230 includes an inwardly downwardly directed edge 252 which serves as a tray holddown means, and along with the similar edge 228 of the cover 224 of wheel 200, prevents the overlapping relationship of the trays during their travel through the turning station.

The peripheral drive wheels 230 include a sprocket wheel 254 secured therebeneath by bolts 256. An endless belt 258 as shown most readily in FIGS. 17 and the schematic view of FIG. 18 passes around each of the sprocket wheels 254 of the peripheral wheels 230 in turn, thereby turning each of the peripheral wheels in the same direction. The belt 258 then passes beneath the tray path to idlers 260 which return it to the first set of wheels of the drive rollers 60. The belt 258 returns from the second set of wheels associated with the drive rollers 60 and by means of idlers 262 passes around the sprocket wheel 206 driving the wheel 200. Movement of the endless belt 258 will accordingly drive the four drive rollers 60 of the turning station, the large central wheel 200 thereof, and the plurality of peripheral wheels 230. Idler sprocket 260 provides belt tension adjustment as shown in FIGS. 17 and 18.

To prevent the corners of the trays from engaging the peripheral wheels at an undesirable angle, guide fences 264 are disposed between the peripheral rolls to smoothly guide the trays in an arcuate path.

The turning station illustrated is not provided with its own power source, instead deriving its power from one or both of the adjacent connecting conveyor sections by means of the transfer belts 170 driving the drive sprockets 168 of the endmost drive roller shafts 70.

It is recognized that the paths described by the tray supporting flanges 202 of the wheel 200 and 232 of the peripheral wheels 230 are moving in much smaller circular paths than that of the trays themselves. As a result there will be considerable sliding movement of the tray-supporting surfaces with respect to the bottoms of the trays. However, in view of the relatively light loading of the trays, such sliding movement of the supporting wheels with respect to the trays is harmless and will not interfere with the steady progress of the trays through the turning station.

In FIG. 19, an add-on tray emptying station is illustrated including a front operated tray accumulator for lifting one or more trays from the supporting drive rolls to arrest the progress of the tray and permit the contents of the tray to be removed. The structure of the conveyor at the station illustrated in FIG. 19 is substantially the same as that shown in FIG. 7 with the addition of the accumulator assembly which includes one or more small rollers 266 mounted on vertically movable roller support means 268 which is slidably disposed within a frame member 270 extending from the upstanding element 78 of the frame support member 56. A substantially vertical actuating arm 272 is connected at its upper end to the support member 268 and at its lower end to one end of lever 274 which is pivotally supported by a standard 278 mounted on floor plate 280. A tension spring 282 extending between the floor plate 280 and the lower end of the arm 272 urges the arm 272 into its lowered position shown in solid lines. An extending end 284 of the lever 274 terminates in a transverse foot bar 286, the depression of which by the foot of a tray attendant moves the lever 284 through the angle alpha against the floor stop 288. This displacement of the lever 274 moves the arm 272 upwardly, with the element 268 sliding through the frame member 270 and raising the roller or rollers 266 into lifting engagement with the bottom of the tray, thereby lifting the tray 26 off of the drive rollers 60 and into the position shown in broken lines. The tray holddown means is relieved in the area of the accumulator just enough to permit the lifting of the trays from the drive rolls. The rollers 266 permit the hand movement of the tray 26 in either direction or the holding in place of a tray without shutting down the balance of the driven conveyor.

When the lifted tray has been emptied, the foot bar 286 is released and the spring 282 returns the lever 274 to its original position with an ear 290 of the lever 274 bearing against the stop 292 of standard 278. The accumulator can be used selectively, and may in some instances not be needed if the trays are lightly loaded and can be emptied quickly. A heavily loaded tray, on the other hand, may require application of the accumulator to stop the tray and permit its orderly unloading.

In FIG. 20, an add-on tray loading station is illustrated which might be used, for example, by patrons of a cafeteria for placement of trays bearing soiled dishes or silverware onto the conveyor. The tray loading station includes a wall 294 having a window 296 through which the loaded trays 298 are passed onto the full width rolls 300 of the conveyor. The full width rollers 300 are driven by ears 192 similar to that shown on FIG. 10 at the left hand side. The roller will be fitted with a closed end and pin which in turn is supported by ball bearings attached to the pass window frame work. The open center type of conveyor section would be impractical at the tray loading station, since it would be possible to release the tray before the tray edges were positioned over the opposed rollers, permitting the tray and contents to descend between the rollers.

The conveyor section comprising the full span rollers 300 is preferably inclined as illustrated in FIG. 20 so that the trays will drift towards the drive roller flanges 302 along the back edge of the conveyor path and thereby align the trays for travel along the conveyor run. A series of inclined soft material deflectors 304 and vertical skirts 305 are provided to catch, cushion and deflect dishes or items of silverware which are accidently displaced from the trays or which are placed loose on the rollers without a tray and which fall between the rollers 300. Such items drop into a portable sink 306 which is filled with water and which includes an interior basket 308 for receiving the falling items.

In order to prevent a tray from being stacked on top of a tray already on the conveyor, a series of vertical parallel bars 310 are arranged over the tray loading area providing a clear vision of the area therethrough by including lower end portions 312 which extend over the tray loading area and restrict the room available above the conveyors for adding an additional overlapped tray.

To prevent trays from being loaded onto the conveyor in the event of a conveyor breakdown or malfunction, a gate 314 pivotally mounted to the bars 310 at 316 is releasable by solenoid 318 and will close by spring action to the position shown in broken lines at 320 to block access to the conveyor. The gate 314 may be made of a series of bars much like the bars 310.

Instead of the use of bars 310-312 to prevent the double loading of the conveyor, transparent panels of glass or plastic could be utilized for the same purpose. A light 322 is preferably provided above the tray loading station, and the whole is enclosed with an opaque enclosure panel below.

In FIGS. 21 and 22, a modified form of drive arrangement for the conveyor is illustrated. In the embodiment previously described and shown in detail for example in FIGS. 12 and 13, it is necessary to use an odd number of drive rollers in a given conveyor section. With some modification of the path of travel of the endless drive belt, it is possible to provide essentially the same type of conveyor drive using an even number of drive rollers.

One manner in which this may be carried out is illustrated in FIGS. 21 and 22 wherein twelve drive rollers 60 are shown having drive shaft 70 and first and second sprocket wheels 96 and 98 identical with that of the preceding embodiment. The sprocket wheels 96 and 98 are designated 96a or 96b or 98a or 98b depending on whether they are drive sprocket wheels or idler sprocket wheels, as in the preceding embodiment. The essential difference between the embodiments is the path taken by the endless belt 160' between its first flight 162' over and under the first set of sprocket wheels 96a and 96b and the second flight 164' over and under the second set of sprocket wheels 98a and 98b. At the right hand end of the first conveyor flight 162', the belt 160' passes downwardly and around an idler 324 and thence passes diagonally under the full length of the drive roll assemblies to a similar idler 326 aligned with the second set of sprocket wheels 98.

Similarly, the second flight 164', of the endless belt 160' at its right hand end terminates its flight one drive roll assembly short of the end of the conveyor section and passes around an idler 328 and then diagonally beneath the conveyor drive to an idler 330 below the next to the last drive roller assembly at the left end of the conveyor section, from which it passes through the first set of sprocket wheels 98. With this arrangement, as shown in FIG. 22, the flights 162' and 164' pass around opposite sides of the drive shaft 70 of each drive roller and accordingly lighten the load on the bearings in contrast with the first embodiment wherein both flights pass on the same side of each drive shaft. Idlers 324, 326, 328, 330, 332, and 334 also serve as belt tension adjustment devices.

In the modified embodiment of FIGS. 21 and 22, the sprocket wheels 96 and 98 of the endmost drive roller assemblies are both fixed to the drive shaft 70. Since the left hand drive roller of the conveyor section is driven by the second flight 164' of endless belt 160' engaging the drive sprocket 98a and the right hand drive roller is driven the first flight 162' engaging the drive sprocket 96a, there is an unused sprocket on each of the endmost drive shafts. This can be utilized as illustrated to connect the conveyor section to the adjacent section which presumably would be of the same type of drive arrangement. For example, at the left hand end of the illustrated conveyor section, a drive belt 330 is utilized in conjunction with idler 332, the sprocket 96a of the last drive roller assembly, and the sprocket 96a of the adjoining assembly to connect the two conveyor sections. A similar arrangement is used at the right hand end of the conveyor section, using the sprockets 98a and a drive belt 333 joining the conveyor sections. A motor drive sprocket 334 is included showing schematically how a motor drive could be incorporated into the conveyor section linkage and thereby eliminate the need for more than two sprocket wheels on the drive roller shaft. However, when an even number of sprocket assembly is placed next to an odd number of sprockets, then a third sprocket location will be required to drive the sprocket of the even numbered sprocket assembly.

As mentioned above, the light weight construction of the conveyor permits its mounting either on floor supports such as shown for example in FIG. 3 and FIG. 19, by wall brackets, for example as shown by the bracket assembly 336 in FIG. 6, or by a ceiling suspension trapeze type arrangement, for example wherein ceiling hung rods support the transverse conveyor frame members 50.

It may further be advantageous to tilt the conveyor transversely as schematically indicated in FIG. 6 to place more of the tray contact against the drive rollers or to compensate for centrifugal force in curved conveyor sections. As shown for example in FIG. 7, the supporting frame preferably includes a plurality of adjustment holes 338 to permit the selective incline of the transverse frame cross members 50 by pivotal movement about bolt 87 and the selective placement of bolt 340 in one of the holes 338. Supporting frame and holes 338 shall be spaced as hereinbefore described with respect to bolt holes 138 (FIG. 7) for vernier type adjustment.

The present conveyor construction is particularly well adapted for curves of any radius. Since the rolls should be evenly spaced along the conveyor edges, in a tight turn there will be more rolls on the outside of the curve than on the inside thereof. The present conveyor accommodates such a differential in the number of rolls since the opposed rolls are totally independent except at places wherein the crossover drive arrangement is employed. The close spacing of the drive rolls insures that the angular change from one drive sprocket to the next is relatively small and will be easily accommodated by the over and under path of the drive belt flights, particularly using the preferred drive belt and sprocket arrangement described above.

The conveyor is also well adapted for the ascending or descending transitions such as the sections 34 of FIGS. 1a, 1b, 2a and 2b. As shown for example in FIG. 3, the transition section 34 includes end rolls in planar alignment and then arcuately aligned interior rolls which smoothly deliver the trays into an ascending or descending path without any sharp bumps which might dislodge the tray contents, or telescope the trays.

Figure 25:
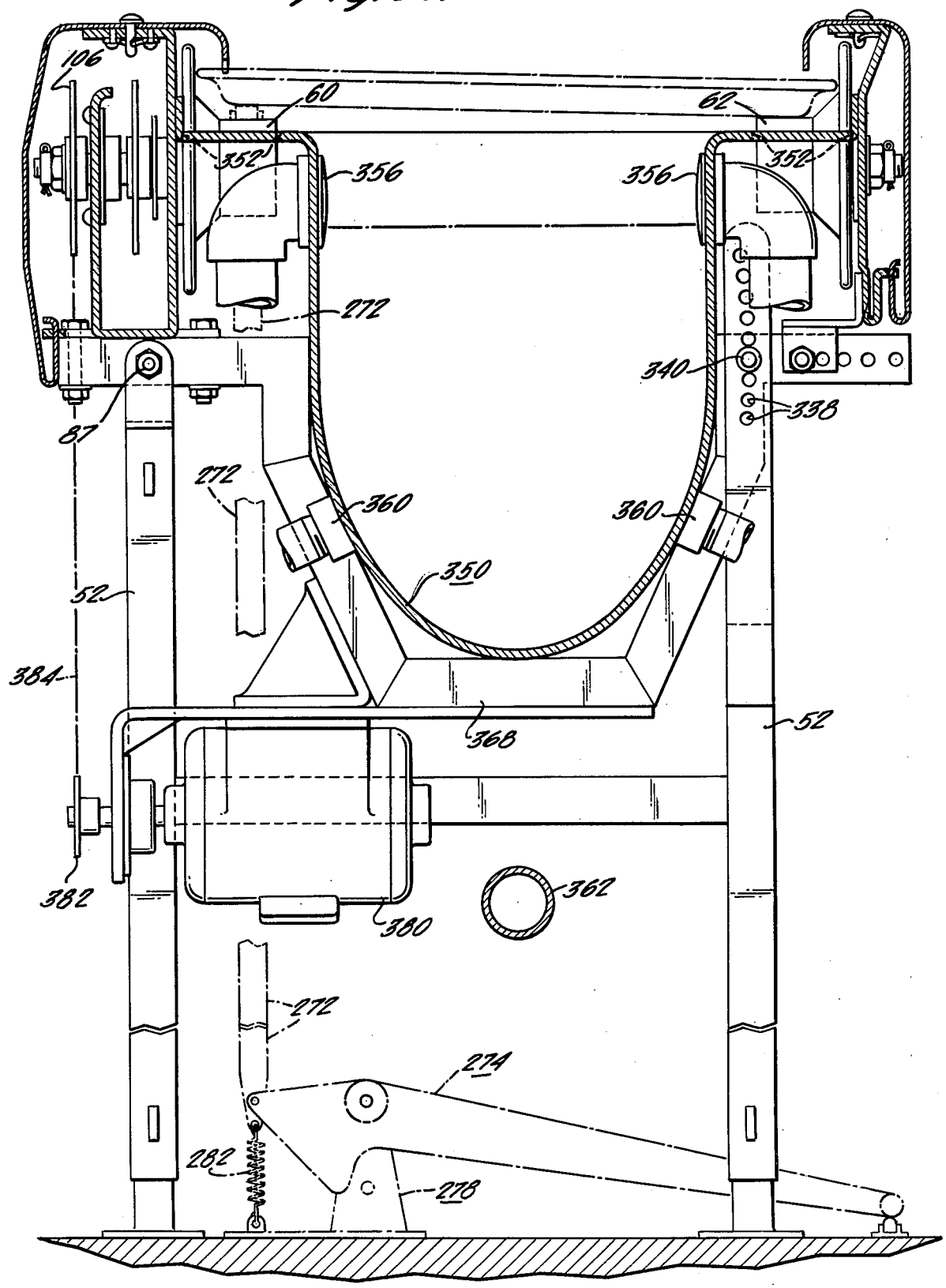
FIG. 25 is a sectional view taken along line 25—25 of FIG. 24.

Referring to the drawings, FIGS. 23-25 show a modified form of tray unloading station wherein a central swill trough 350 is located between and beneath the conveyor rollers and extends along the tray unloading station. The swill trough is preferably used in conjunction with the accumulator assembly shown in FIG. 19 and in conjunction with dish, glass, cup and flatware racks which are preferably disposed on a dish table on the opposite side of the conveyor from the person unloading the trays. When a tray arrives at the unloading station, the accumulator is actuated to stop the tray movement, the debris from the dishes, glasses and flatware are emptied into the swill trough; they then are placed into dish machine racks (or piled in stacks) on the adjoining dish table, and then the tray is upended to deposit any remaining debris into the swill trough. The empty tray then proceeds along the conveyor to a tray unloading and stacking device.

Considering the details of the swill trough, the trough 350 has a substantially elliptical sectional shape as shown in FIG. 25 and extends from the frame assembly just below the axes of the rollers 60 and 62, cutouts 352 being provided in the edges thereof to accommodate the rollers. As shown in FIG. 24, the bottom of the swill trough 350 is inclined so that the contents thereof will tend to flow toward the deep end of the trough which is connected with a schematically illustrated waste disposal device 354 which may comprise a conventional salvajor, pulper, disposor, hydro-extractor or the like.

In order to prevent the possible overflowing of the swill trough, overflow drains 356 are provided near the upper edges thereof at spaced intervals, the drains being provided with suitable filtration devices to permit only liquids to pass therethrough. The drains 356 are connected by conventional piping 358 to the buiding sewage system.

In order to encourage movement of the swill trough contents toward the waste disposal device, water jets 360 are disposed at spaced intervals along the trough below the normal fluid level thereof and directed toward the deep end of the trough. Suitable piping 362 connects the jets 360 to a source of pressurized liquid such as water which in the embodiment illustrated comprises the waste disposal device 354.

As shown in FIGS. 23 and 24, the swill trough may extend over more than one conveyor section and means are accordingly provided for joining the prefabricated sections in fluid-tight relation. These means include a gasket 364 and connecting hardware such as the illustrated bolts 366 passing through flanged edge portions of the swill trough. Similarly, the piping 362 for the jets and disposal device 354 is joined by a similar gasketed, bolted connection.

As shown in FIG. 25, the tubular frame assembly supporting the conveyor in the region of the swill trough includes cross members 368 having a U-shaped configuration to accommodate the trough. The conveyor is otherwise of th previously described construction throughout the tray unloading region.

In the embodiment illustrated, the waste disposal device 354 is placed in line with the conveyor at the end of the conveyor run, accordingly requiring the manual removal of the trays following their unloading. However, in a modified arrangement, the waste disposal device can be offset from the conveyor to permit the trays to pass directly into a tray washing and/or tray stacking and/or storage system.

A drive arrangement for the conveyor sections including the swill trough comprises a motor 380 mounted beneath a frame cross member 368. A drive belt 384 connects the drive sprocket 382 of motor 380 with a drive sprocket 106 of the conveyor section. Belt tension is regulated by means of idler sprockets 386 as shown in FIG. 24.

In FIG. 26, a section is shown taken through a typical portion of the conveyor run wherein the conveyor is provided with a drip pan 370 as may be required, for example, in situations where the conveyor passes over doorways or other areas where items which might become dislodged from the trays could fall and possible do harm to people or property located beneath the conveyor. The drip pan 370 as illustrated includes a peripheral upstanding flange 372 and is slotted at 374 to accommodate the vertical frame members 52. The drip pan is supported on brackets 376 attached to the upright frame members 52 and 336 and may be readily removed for cleaning by lifting one side to cock the pan at an angle, thereby permitting the pan to be swung clear of the brackets and removed on edge from the conveyor frame assembly.

Manifestly, changes in details of construction can be effected by those skilled in the art without departing from the spirit and scope of the present invention.

I claim:

1. A conveyor system comprising a frame, a plurality of rollers rotatably mounted on said frame, said rollers being disposed in spaced, adjoining relation to sequentially receive and transport articles therealong, a drive arrangement comprising a shaft extending coaxially from each roller, first and second wheels disposed in spaced relation on each said shaft, one of said first and second wheels of each shaft comprising a drive wheel and being fixed to the shaft and the other comprising an idler wheel and being freely rotatable with respect thereto, an endless belt passing in one flight alternately over and under the first wheels of said shafts and in another flight alternately over and under the second wheels of said shafts, drive means for driving said belt, a turning station for effecting relatively sharp changes in the direction of the article path, said turning station comprising a central wheel rotatably mounted on said frame for rotation about a substantially vertical axis, said central wheel including an article-supporting annular flange extending substantially horizontally therefrom, a plurality of peripheral wheels disposed in spaced relation from said central wheel in a substantially arcuate arrangement concentric with said central wheel, said peripheral wheels being mounted on said frame for rotation about substantially verticle axes and each including article-supporting annular flanges extending substantially horizontally therefrom, and drive means for driving said central wheel and said peripheral wheels.

2. The invention as claimed in claim 1 wherein said drive wheel includes a sprocket and wherein said belt includes means engaging said sprocket to provide a positive drive of said drive wheel.

3. The invention as claimed in claim 1 wherein said drive means comprises a third wheel disposed on one of said roller shafts for rotation therewith, a motor mounted on said frame, and a drive belt operatively connecting said motor and said third wheel.

4. The invention as claimed in claim 1 including means at each end of the conveyor for reversing the direction of said belt.

5. An apparatus for conveying trays, comprising at least one section, each section comprising: a set of drive rollers located at one edge of a path along which said trays are to be conveyed and positioned so as to support one side of said trays, said drive rollers including drive shafts extending coaxially therefrom, a set of idler rollers located along the opposite edge of said path and positioned so as to support the opposite side of said trays, means for rotating said drive rollers in the same direction to move said trays along said path, said means for rotating said drive rollers comprising first and second wheels disposed in spaced relation on each said drive shaft, an endless drive belt passing alternately over and under the first wheels of said drive shaft in one flight thereof and alternately over and under the second wheels of said drive shafts in a second flight thereof, alternate ones of the wheels engaged by each flight of said drive belt being fixed to their drive shafts to provide a driving rotation thereof while the remaining wheels engaged by each flight are freely rotatable upon their respective drive shafts, means for driving said drive belt, a turning station for effecting relatively sharp changes in the direction of the tray path, said turning station comprising a central wheel rotatably mounted on said frame for rotation about a substantially vertical axis, said central wheel including a tray-supporting annular flange extending substantially horizontally therefrom, a plurality of peripheral wheels disposed in spaced relation from said central wheel in a substantially arcuate arrangement concentric with said central wheel, said peripheral wheels being mounted on said frame for rotation about substantially vertical axes and each including tray-supporting annular flanges extending substantially horizontally therefrom, and drive means for driving said central wheel and said peripheral wheels.

6. The invention as claimed in claim 5 wherein each of the wheels fixed to the drive shafts is of the same diameter to provide a uniform speed of rotation of each of the drive rollers.

7. The invention as claimed in claim 5 wherein each of said wheels fixed to said drive shafts includes sprockets and wherein said belt includes means engaging said sprockets to provide a positive drive of the wheels.

8. The invention as claimed in claim 5 wherein said means for driving said drive belt comprises a third wheel disposed on one of said drive shafts for rotation therewith, a motor mounted on said apparatus, and a drive belt operatively connecting said motor and said third wheel.

9. The invention as claimed in claim 5 including means at each end of the conveyor for reversing the direction of said drive belt.

10. A conveyor for trays, pallets or the like comprising a frame assembly, said frame assembly comprising a pair of spaced parallel frame members, a set of longitudinally spaced drive rollers rotatably mounted on one of said frame members, a plurality of longitudinally spaced idler rollers rotatably mounted on the other of said frame members juxtaposed from said driving rollers, said drive and idler rollers extending into the space between said frame members a distance sufficient to support the opposite edges of the trays, pallets or other articles to be conveyed, drive means for rotating said drive rollers in the same direction at the same speed, said drive means comprising a drive shaft connected to an extending from each said drive roller, each said drive shaft having a first and a second wheel mounted thereon, the first wheels of said drive rollers being substantially in alignment to form a first set of wheels, and the second wheels of said drive rollers being substantially in alignment to form a second set of wheels adjacent to said first set of wheels, and endless drive belt having a first flight in engagement with each of said first set of wheels and a second flight in engagement with each of said second set of wheels, means at the ends of said conveyor for reversing the direction of said drive belt, said first flight of said drive belt passing alternatively over and under the wheels of said first set of wheels, said second flight of said drive belt passing alternately over and under the wheels of said second set of wheels, the first wheels of alternate ones of said drive rollers being fixed to their respective shafts while the second wheels thereof are freely rotatable thereon, the second wheels of the rest of said drive rollers being fixed to their respective shafts while the first wheels thereof are freely rotatable thereon, means for driving said drive belt, a turning station for effecting relatively sharp changes in the direction of the tray path, said turning station comprising a central wheel rotatably mounted on said frame for rotation about a substantially vertical axis, said central wheel including a tray-supporting annular flange extending substantially horizontally therefrom, a plurality of peripheral wheels disposed in spaced relation from said central wheel in a substantially arcuate arrangement concentric with said central wheel, said peripheral wheels being mounted on said frame for rotation about substantially vertical axes and each including tray-supporting annular flanges extending substantially horizontally therefrom, and drive means for driving said central wheel and said peripheral wheels.

11. The invention as claimed in claim 10 wherein each of said wheels fixed to said drive shafts includes sprockets and wherein said belt includes means engaging said sprockets to provide a positive drive of the wheels.

12. The invention as claimed in claim 10 wherein said means for driving said drive belt comprises a third wheel disposed on one of said drive shafts for rotation therewith, a motor mounted on said frame assembly, and a drive belt operatively connecting said motor and said third wheel.

13. The invention as claimed in claim 10 wherein said drive means for driving said central wheel and said peripheral wheels comprises said drive belt and means for driving said drive belt.

14. The invention as claimed in claim 10, including a demountable drip pan on the frame assembly beneath said rollers for receiving items dislodged from the conveyed trays.

15. The invention as claimed in claim 10, including means for selectively lifting said trays from said drive rollers to stop tray movement.

16. The invention as claimed in claim 15 wherein said means for selectively lifting said trays comprises a foot operated lever assembly engageable with the edge of the trays supported by said drive rollers.

17. A conveyor as claimed in claim 10, including a tray loading station, said loading station comprising means preventing a loaded tray from being placed on said conveyor on top of a previously deposited loaded tray, and means beneath said conveyor for receiving items dislodged from said trays.

18. The invention as claimed in claim 17 wherein said means for preventing placement of one loaded tray on another comprises a plurality of spaced bars disposed above said conveyor.

19. The invention as claimed in claim 10 including a tray unloading station comprising a swill trough disposed beneath and between said frame members whereby waste matter from said trays can be dumped into the middle of the conveyor between the drive and idler rollers.

20. The invention as claimed in claim 19 wherein said swill trough slopes downwardly toward one end thereof, means for removing waste from said one end thereof, and means for directing the trough contents toward said one end.

21. The invention as claimed in claim 20 wherein said means for directing the trough contents toward said one end comprises jets for directing a pressurized fluid within said trough.

22. An apparatus as claimed in claim 5 comprising a plurality of sections, each of said sections being a modular conveyor section, and common drive means for driving said plurality of sections, said common drive means comprising a motor on one of said sections, means connection said motor to one of the drive shafts of said one section to effect a drive of the drive belt thereof, and means connecting the drive rollers of said one section with the drive rollers of the other of said plurality of sections.

23. The invention as claimed in claim 22 wherein said means connecting the drive rollers of said one section with the drive rollers of the other of said plurality of sections comprises a third wheel on the endmost drive rollers of each adjoining conveyor sections, and a transfer drive belt connecting each pair of said third wheels.

24. An apparatus as claimed in claim 5 comprising a plurality of sections, each of said sections being a modular conveyor section, said system including a transition section for joining horizontal and inclined conveyor sections, said transition section including at each end thereof at least a pair of drive and idler rollers aligned with the drive and idler rollers of the adjoining conveyor section, the remainder of said drive and idler rollers being arranged in an arcuate configuration to provide a smooth transfer of the trays to and from the inclined conveyor sections.

25. A turning station for a tray conveyor for effecting relatively sharp changes in the direction of the tray path, said turning station comprising a central wheel rotatably mounted on said frame for rotation about a substantially vertical axis, said central wheel including a tray-supporting annular flange extending substantially horizontally therefrom, a plurality of peripheral wheels disposed in spaced relation from said central wheel in a substantially arcuate arrangement substantially concentric with said central wheel, said peripheral wheels being mounted on said frame for rotation about substantially vertical axes and each including tray-supporting annular flanges extending substantially horizontally therefrom, and drive means for driving said central wheel and said peripheral wheels.

* * * * *

UNITED STATES PATENT AND TRADEMARK OFFICE
CERTIFICATE OF CORRECTION

PATENT NO. : 4,479,572
DATED : October 30, 1984
INVENTOR(S) : William J. Merz

It is certified that error appears in the above-identified patent and that said Letters Patent is hereby corrected as shown below:

```
     Column 2, line 6, and column 4, line 25, "conveyo"
should read --conveyor--.
     Column 3, line 6, "necessar" should read --necessary--.
     Column 3, lines 43-44, insert --a-- after "provide".
     Column 4, line 30, "ma" should read --may--.
     Column 7, line 8, insert --a-- after "with".
     Column 7, line 19, "a" should read --as--.
     Column 9, line 18, "purpos" should read --purpose--.
     Column 12, line 44, "adJacent" should read --adjacent--.
     Column 16, line 29, insert --by-- after "driven".
     Column 17, line 39, "adjoining" should read
--adjoining--.
     Column 18, line 14, "th" should read --the--.
     Column 18, line 36, "possible" should read --possibly--.
     Column 19, line 7, "verticle" should read --vertical--.
     Column 22, line 4, "connection" should read
--connecting--.
```

Signed and Sealed this

Twentieth Day of August 1985

[SEAL]

Attest:

DONALD J. QUIGG

Attesting Officer    Acting Commissioner of Patents and Trademarks